United States Patent
Garrett et al.

(10) Patent No.: US 10,783,178 B2
(45) Date of Patent: Sep. 22, 2020

(54) GENERATING A PERSONAL DATABASE ENTRY FOR A USER BASED ON NATURAL LANGUAGE USER INTERFACE INPUT OF THE USER AND GENERATING OUTPUT BASED ON THE ENTRY IN RESPONSE TO FURTHER NATURAL LANGUAGE USER INTERFACE INPUT OF THE USER

(71) Applicant: Google Inc., Mountain View, CA (US)

(72) Inventors: Maryam Garrett, Cambridge, MA (US); Wan Fen Nicole Quah, Cambridge, MA (US); Bryan Horling, Belmont, MA (US); Ruijie He, Roxbury Crossing, MA (US)

(73) Assignee: GOOGLE LLC, Mountain View, CA (US)

( * ) Notice: Subject to any disclaimer, the term of this patent is extended or adjusted under 35 U.S.C. 154(b) by 958 days.

(21) Appl. No.: 15/157,297

(22) Filed: May 17, 2016

(65) Prior Publication Data
US 2017/0337265 A1 Nov. 23, 2017

(51) Int. Cl.
*G06F 16/338* (2019.01)
*G06F 16/33* (2019.01)
(Continued)

(52) U.S. Cl.
CPC ........ *G06F 16/338* (2019.01); *G06F 16/3344* (2019.01); *G06F 16/907* (2019.01);
(Continued)

(58) Field of Classification Search
USPC ........................................................ 707/723
See application file for complete search history.

(56) References Cited

U.S. PATENT DOCUMENTS

| 7,685,144 B1* | 3/2010 | Katragadda ........... G06F 17/243 |
| | | 707/999.101 |
| 2009/0198671 A1* | 8/2009 | Zhang ................ G06F 16/3338 |

(Continued)

FOREIGN PATENT DOCUMENTS

| JP | H11272710 A | 10/1999 |
| JP | 2009205552 A | 10/2009 |
| KR | 20090063092 | 6/2009 |

OTHER PUBLICATIONS

European Patent Office; International Preliminary Report on Patentability of International Application No. PCT/US2016/068737 dated Jun. 27, 2018.

(Continued)

*Primary Examiner* — Cam Linh T Nguyen
(74) *Attorney, Agent, or Firm* — Middleton Reutlinger

(57) ABSTRACT

Some implementations are directed to generating a personal database entry for a user based on free-form natural language input formulated by the user via one or more user interface input devices of a computing device of the user. The generated personal database entry may include one or more terms of the natural language input and descriptive metadata determined based on one or more terms of the natural language input and/or based on contextual features associated with receiving the natural language input. Some implementations are directed to generating, based on one or more personal database entries of a user, output that is responsive to further free-form natural language input of the user. For example, one or more entries that are responsive to further natural language input of the user can be identified based on matching content of those entries to one or more search parameters determined based on the further input.

16 Claims, 11 Drawing Sheets

(51) Int. Cl.
*H04W 4/029* (2018.01)
*G06F 16/907* (2019.01)
*G06F 40/30* (2020.01)
*G06F 40/103* (2020.01)
*G06F 40/169* (2020.01)
*H04W 4/02* (2018.01)

(52) U.S. Cl.
CPC .......... *G06F 40/103* (2020.01); *G06F 40/169* (2020.01); *G06F 40/30* (2020.01); *H04W 4/02* (2013.01); *H04W 4/029* (2018.02)

(56) References Cited

U.S. PATENT DOCUMENTS

| | | | | |
|---|---|---|---|---|
| 2012/0016678 | A1* | 1/2012 | Gruber | G10L 15/22 704/275 |
| 2013/0275164 | A1* | 10/2013 | Gruber | G10L 17/22 705/5 |
| 2014/0163978 | A1* | 6/2014 | Basye | G10L 15/28 704/233 |
| 2014/0236986 | A1* | 8/2014 | Guzman | G06Q 10/107 707/769 |
| 2015/0066479 | A1 | 3/2015 | Pasupalak et al. | |
| 2015/0100562 | A1* | 4/2015 | Kohlmeier | G06F 16/332 707/706 |
| 2015/0254247 | A1* | 9/2015 | Bostick | G06F 16/3344 707/724 |
| 2015/0373183 | A1 | 12/2015 | Woolsey et al. | |
| 2016/0203002 | A1* | 7/2016 | Kannan | G06F 3/167 715/708 |
| 2016/0225370 | A1* | 8/2016 | Kannan | G10L 15/22 |
| 2016/0260433 | A1* | 9/2016 | Sumner | G06F 16/3344 |
| 2017/0068423 | A1* | 3/2017 | Napolitano | G06F 16/90332 |
| 2017/0091612 | A1* | 3/2017 | Gruber | G06F 3/04842 |

OTHER PUBLICATIONS

International Search Report and Written Opinion of PCT Ser. No. PCT/US16/68737 dated Mar. 13, 2017.
European Patent Office; Written Opinion of the International Preliminary Examining Authority of International Application No. PCT/US2016/068737; 10 pages; dated Mar. 29, 2018.
European Patent Office; Communication Pursuant to Article 94(3) EPC issue in Application No. 16826623.7; dated Mar. 4, 2020.
The Korean Intellectual Property Office; Office Action issued in Application No. 10-2018-7036265 dated Feb. 19, 2020.
Japanese Patent Office; Office Action, Application No. JP2018-560513, 10 pages, dated Dec. 2, 2019.

* cited by examiner

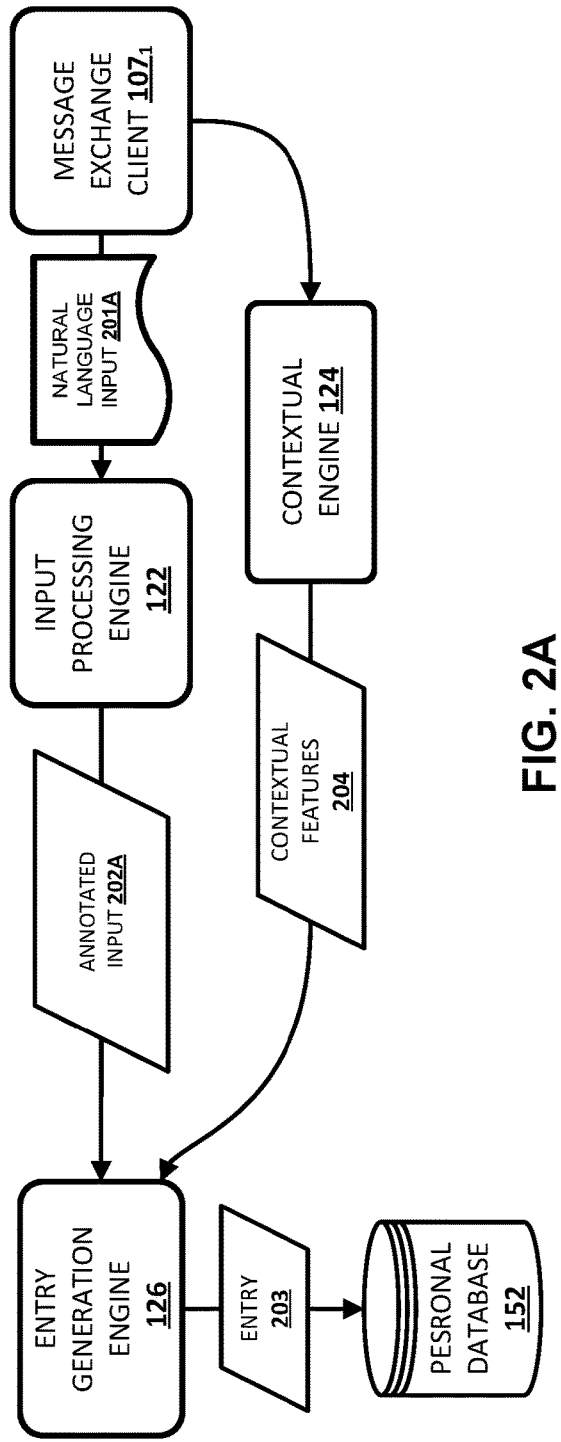
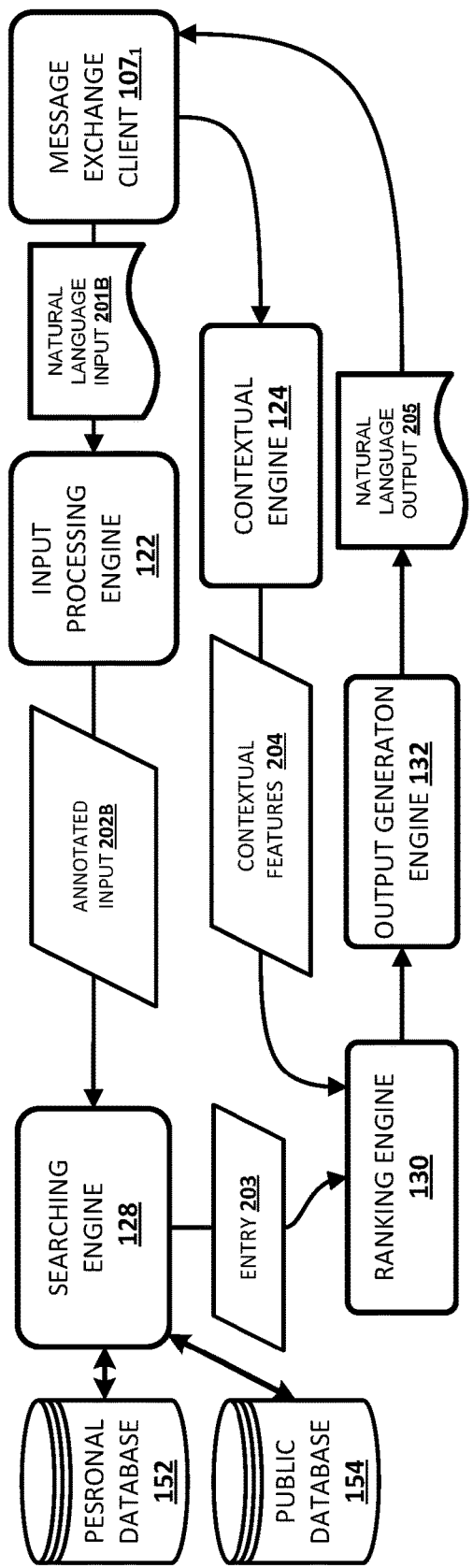

GENERATING A PERSONAL DATABASE ENTRY FOR A USER BASED ON NATURAL LANGUAGE USER INTERFACE INPUT OF THE USER AND GENERATING OUTPUT BASED ON THE ENTRY IN RESPONSE TO FURTHER NATURAL LANGUAGE USER INTERFACE INPUT OF THE USER

BACKGROUND

Some note keeping computer applications and/or other computer applications enable a user to create note entries that include content that is explicitly set by the user. For example, the user may create a note of "call Bob." Further, some computer applications may enable limited searching of the user created notes.

However, these and/or other techniques may suffer from one or more drawbacks. For example, the note keeping computer applications may only enable searching for note entries based on exact keyword matching between terms of a search and terms of the notes. For instance, "call Bob" would only be identified if a search included "call" and/or "Bob". Moreover, some note keeping computer applications may not automatically filter and/or rank note entries that are responsive to a search and/or may only do so based on limited user provided content. Additionally, some note keeping computer applications may require that a user explicitly designate that content provided by the user is to be utilized to create a note entry and therefore do not create any entries for many types of input of the user, such as inputs provided during dialog with a personal assistant and/or during dialog with one or more additional users. Additional and/or alternative drawbacks may be presented.

SUMMARY

Some implementations of this specification are directed to generating a personal database entry for a user based on free-form natural language input formulated by the user via one or more user interface input devices of a computing device of the user, such as natural language input provided to an automated personal assistant and/or provided to one or more computing devices of one or more additional users during communication with those additional users. In some of those implementations, the entry includes one or more terms of the natural language input and optionally includes descriptive metadata that is determined based on one or more terms of the natural language input and/or based on contextual features associated with receiving the natural language input. As used herein, free-form input is input that is formulated by a user and that is not constrained to a group of options presented for selection by the user. For example, it may be typed input provided by the user via a physical or virtual keyboard of a computing device, spoken input provided by the user to a microphone of the computing device, and/or an image captured by the user via a camera (e.g., a camera of the computing device of the user).

Some implementations of this specification are additionally and/or alternatively directed to generating, based on one or more personal database entries of a user, output that is responsive to further free-form natural language input of the user. In some of those implementations, one or more entries that are responsive to further natural language input of the user can be identified based on matching (soft and/or exact) content of those entries (e.g., descriptive metadata and/or terms of those entries) to one or more search parameters determined based on the further natural language input.

Further, in some of those implementations content of an identified entry may be utilized in generating the output and/or in ranking multiple identified entries (where multiple entries are identified) relative to one another. The ranking can be utilized to select a subset of entries (e.g., one entry) to utilize in generating the response and/or to determine a presentation order of multiple pieces of content in a generated response (based on the rankings of the entries from which the multiple pieces of content were derived).

Some implementations of this specification are additionally and/or alternatively directed to analyzing given natural language input to determine a measure indicative of a likelihood that the input is intended as input the user desires an automated personal assistant to recall at a later time and/or to determine a measure indicative of a likelihood that the input is intended as a request for personal information from a personal database of the user.

Natural language input of the user may be received and processed in various scenarios. For example, natural language input may be input provided by the user during communication with one or more other users, such as communication via chat, SMS, and/or via other message exchange. As another example, the natural language input may be provided to an automated personal assistant that engages in dialog with the user via one or more user interface input and output devices. For example, the automated personal assistant may be integrated, in whole or in part, in a computing device of the user (e.g., a mobile phone, a tablet, a device devoted solely to the automated assistant functionality) and may include one or more user interface input devices (e.g., a microphone, a touch-screen) and one or more user interface output devices (e.g., a speaker, a display screen). Also, for example, the automated personal assistant may be implemented, in whole or in part, in one or more computing devices that are separate from, but in communication with, a client computing device of the user.

In some implementations, a method performed by one or more processors is provided that includes receiving first natural language input that is free-form input formulated by a user via a user interface input device of a computing device of the user. The method further includes generating an entry for the first natural language input in a personal database of the user stored in one or more computer readable media and the generating includes: storing, in the entry, one or more given terms of the terms of the first natural language input or an identifier of the given terms; generating descriptive metadata based on at least one of: one or more of the terms of the first natural language input, and one or more contextual features associated with receiving the first natural language input; and storing the descriptive metadata in the entry. The method further includes receiving second natural language input subsequent to receiving the first natural language input. The second natural language input is free-form input formulated by the user via the user interface input device or an additional user interface input device of an additional computing device of the user. The method further includes: determining, based on the second natural language input, at least one search parameter; searching the personal database based on the search parameter; and determining, based on the searching, that the entry is responsive to the second natural language input based at least in part on matching the search parameter to at least some of the descriptive metadata. The method further include generating natural language output that includes one or more natural language output terms that are based on the entry and providing, in response to the second natural language input, the natural language output for presentation to the user via a user interface output device of the computing device or of the additional computing device.

This method and other implementations of technology disclosed herein may each optionally include one or more of the following features.

In some implementations, generating the descriptive metadata is based on both the given terms of the first natural language input and the one or more contextual features associated with receiving the first natural language input.

In some implementations, generating the descriptive metadata is based on one or more contextual features associated with receiving the first natural language input and generating the descriptive metadata based on the one or more contextual features includes: generating temporal metadata that indicates a date or a time that the first natural language input was received. In some of those implementations where temporal metadata is generated, the at least one search parameter is a temporal search parameter and determining that the entry is responsive to the second natural language input includes matching the temporal search parameter to the temporal metadata. In some of those implementations where temporal metadata is generated, the method further includes determining that an additional entry is responsive to the second natural language input and selecting the entry in lieu of the additional entry based on conformance of a current date or time to the temporal metadata of the entry. In some versions of those implementations, providing the natural language output that includes at least some of the given terms of the entry is in response to selecting the entry, and the additional entry is not utilized in generating the natural language output and no output that is based on the additional entry is provided in response to the second natural language input. In some versions of those implementations, generating the natural language output includes generating one or more temporal terms of the natural language output based on the temporal metadata of the entry.

In some implementations, generating the descriptive metadata is based on one or more contextual features associated with receiving the first natural language input and generating the descriptive metadata includes: generating locational metadata that indicates a location of the user when the first natural language input was received. In some of those implementations where locational metadata is generated, the at least one search parameter is a locational search parameter and determining that the entry is responsive to the second natural language input includes matching the locational search parameter to the locational metadata. In some of those implementations where locational metadata is generated, the method further includes: determining that an additional entry is responsive to the second natural language input; and selecting the entry in lieu of the additional entry based on conformance of a current location of the user to the locational metadata of the entry. In some versions of those implementations, providing the natural language output that includes at least some of the given terms of the entry is in response to selecting the entry, and the additional entry is not utilized in generating the natural language output and no output that is based on the additional entry is provided in response to the second natural language input. In some versions of those implementations, generating the natural language output includes generating one or more locational terms of the natural language output based on the locational metadata of the entry.

In some implementations, the first natural language input is provided during communication between the user and at least one additional user, generating the descriptive metadata is based on one or more contextual features associated with receiving the first natural language input, and generating the descriptive metadata includes generating additional user metadata of the descriptive metadata. The additional user metadata identifies the additional user in communication with the user when the first natural language input was received. In some of those implementations where additional metadata is generated, the communication between the user and the additional user is via a first message exchange client of the computing device of the user and a second message exchange client of an additional user computing device of the additional user.

In some implementations, generating the descriptive metadata is based on one or of the terms of the first natural language input and generating the descriptive metadata based on one or more of the terms of the first natural language input includes generating a semantic label of the descriptive metadata based on one or more of the terms. The semantic label indicates a classification to which the one or more terms belong and to which additional terms not included in the first natural language output also belong. In some of those implementations where the semantic label is generated, the at least one search parameter is a semantic search parameter and determining that the entry is responsive to the second natural language input includes matching the semantic search parameter to the semantic label. In some versions of those implementations, determining the search parameter is based on a prefix of the second natural language input. In some of those implementations where the semantic label is generated, the method further includes determining, that an additional entry is responsive to the second natural language input and selecting the entry in lieu of the additional entry based on conformance of the second natural language input of the user to the semantic label of the entry. In some versions of those implementations, providing the natural language output that includes at least some of the given terms of the entry is in response to selecting the entry, and the additional entry is not utilized in generating the natural language output and no output that is based on the additional entry is provided in response to the second natural language input.

In some implementations, the method further includes determining, based on at least one of the terms of the second natural language input, a measure indicative of a likelihood that the second natural language input is a request for information from the personal database. In some of those implementations, at least one of the searching and the providing are dependent on a magnitude of the measure.

In some implementations, a method performed by one or more processors is provided that includes: receiving first natural language input that is free-form input formulated by a user via a user interface input device of a computing device of the user and generating an entry for the first natural language input in a personal database of the user stored in one or more computer readable media. The generating includes: storing, in the entry, one or more given terms of the terms of the first natural language input or an identifier of the given terms; generating descriptive metadata based on at least one of: one or more of the terms of the first natural language input, and one or more contextual features associated with receiving the first natural language input; and storing the descriptive metadata in the entry. The method further includes: receiving second natural language input subsequent to receiving the first natural language input; determining at least one search parameter based on the second natural language input; searching the personal database based on the search parameter; determining, based on the searching, that the entry is responsive to the second natural language input; determining, based on the searching, that an additional entry is also responsive to the second natural language input; ranking the entry relative to the additional entry based on at least some of the descriptive metadata; generating natural language output that includes one or more natural language output terms that are based on the entry; and providing, in response to the second natural language input, the natural language output for presentation to the user via a user interface output device, wherein providing the natural language output is based on the ranking of the entry relative to the additional entry.

This method and other implementations of technology disclosed herein may each optionally include one or more of the following features.

In some implementations, providing the natural language output based on the ranking of the entry relative to the additional entry includes providing the natural language output without providing any output that is based on the additional entry in response to the second natural language input.

In some implementations, providing the natural language output based on the ranking of the entry relative to the additional entry includes providing the natural language output and providing additional output based on the additional entry, and providing the natural language output and the additional output for presentation in an order that is based on the ranking.

In addition, some implementations include one or more processors of one or more computing devices, where the one or more processors are operable to execute instructions stored in associated memory, and where the instructions are configured to cause performance of any of the aforementioned methods. Some implementations also include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2A illustrates an example of generating a personal database entry for a user based on free-form natural language input formulated by the user via one or more user interface input devices of a computing device of the user.

FIG. 2B illustrates an example of generating, based on one or more personal database entries of a user, natural language output that is responsive to further free-form natural language input of the user.

DETAILED DESCRIPTION

Figure 1:
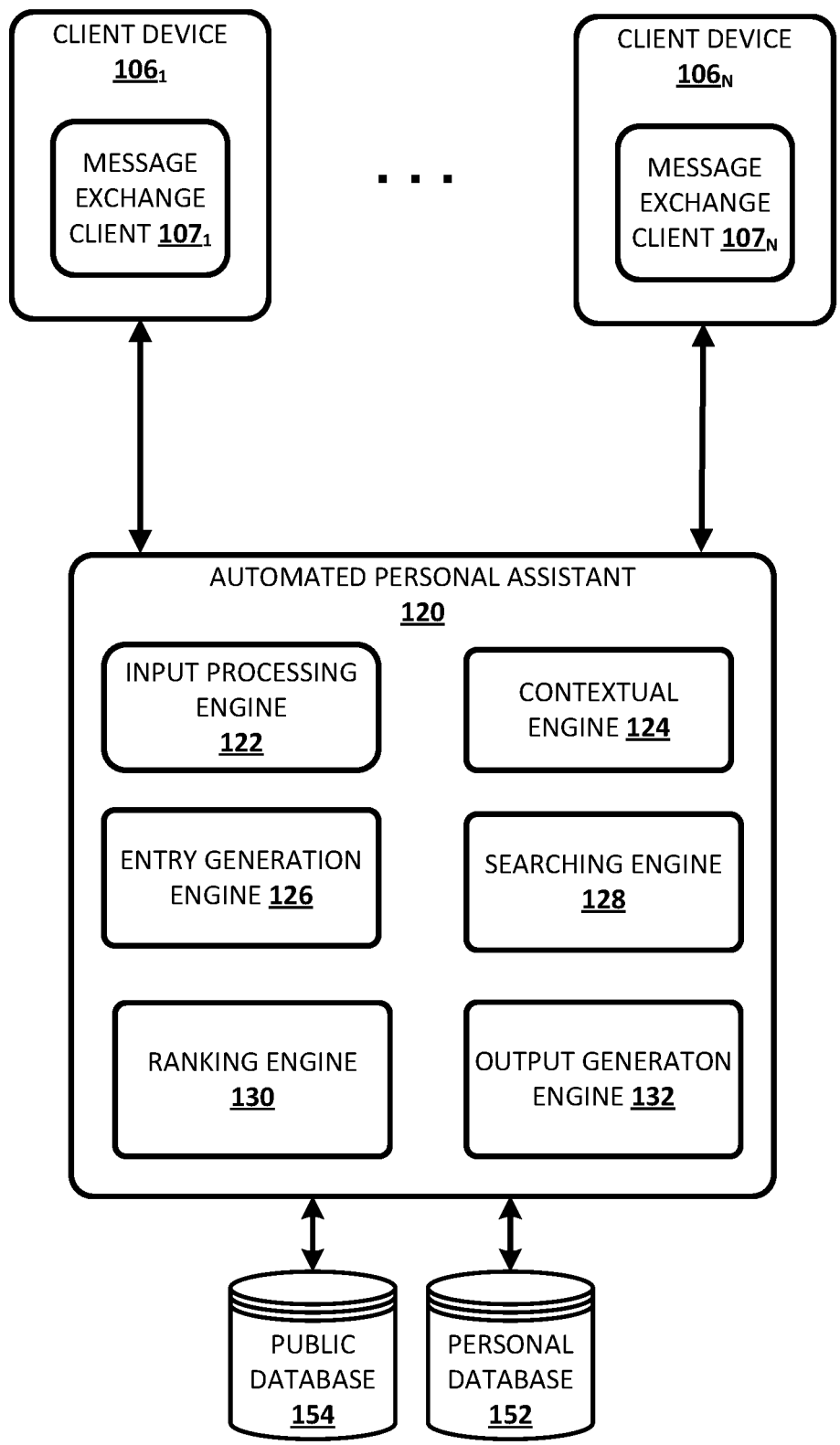
FIG. 1 is a diagram of an example environment in which implementations disclosed herein may be implemented.

Implementations of this specification are directed to generating a personal database entry for a user based on free-form natural language input formulated by the user via one or more user interface input devices of a computing device of the user. For example, the personal database entry may be generated by an automated personal assistant in response to natural language input provided to the automated personal assistant. A personal database entry, as used herein, is an entry in a personal database that is accessible to the user and non-accessible to a plurality of additional users that differ from the user. For example, the personal database may be accessible to only the user and one or more applications and/or systems specified by the user and non-accessible by any other users, applications, and/or systems. Also, for example, the personal database may be accessible to the user and certain additional users designated by the user. As described herein, any personal database may be stored on one or more computer readable media and may be associated with access information to allow access only to users, applications, and/or systems that are authorized to access such content and prevent access to all other users, applications, and/or systems.

In some implementations, a generated personal database entry includes one or more terms of the natural language input and optionally includes descriptive metadata that is determined based on one or more terms of the natural language input and/or based on contextual features associated with receiving the natural language input.

Descriptive metadata that is determined based on the terms of the natural language input may include, for example, a semantic label indicating a classification to which one or more of the terms belong and to which additional terms not included in the natural language output also belong. For example, a semantic label of "person" may be determined based on the term "Bob", a semantic label of "place" may be determined based on the term "home", etc. Another example of descriptive metadata determined based on the terms of the natural language input may include "memoryness" metadata that indicates the likelihood (e.g., true/false, or a range of values) that the natural language input is intended as input the user desires an automated personal assistant to be able to recall at a later time. For example, descriptive memoryness metadata that indicates a high likelihood the user desires the ability for future recall may be generated based on the presence of certain key terms in the input (e.g., "remember", "don't forget") and/or based on output received in response to providing the input to a classifier trained to predict whether and/or to what degree natural language input indicates a desire for the natural language input to be "remembered".

The descriptive metadata that is determined based on the contextual features associated with receiving the natural language input may include, for example, temporal metadata, locational metadata, and/or additional user metadata. The temporal metadata may indicate a date (e.g., May 1, 2016; May; 2016; last week; Sunday) and/or a time (e.g., 8:00 AM, morning, between 7:00 and 9:00) that the natural language input was received. The locational metadata may indicate a location of the user (e.g., a ZIP code, "home", "work", a City, a Neighborhood) when the natural language input was received. The additional user metadata may indicate one or more additional users to whom the natural language input was directed and/or one or more additional users who were engaged in communication with the user when the natural language input was received. For example, when the natural language input is received from an ongoing message exchange thread (e.g., chat, SMS) between the user and an additional user, the additional user metadata may indicate the additional user.

Implementations of this specification are additionally and/or alternatively directed to generating, based on one or more personal database entries of a user, output that is responsive to further free-form natural language input of the user. In some of those implementations, one or more entries that are responsive to further natural language input of the user can be identified based on matching (soft and/or exact) content of those entries (e.g., descriptive metadata and/or natural language input terms of those entries) to one or more search parameters determined based on the further natural language input. Further, in some of those implementations content of an identified entry may be utilized in generating the output and/or in ranking multiple identified entries (where multiple entries are identified) relative to one another. The ranking can be utilized to select a subset of entries to utilize in generating the response and/or to determine a presentation order of multiple pieces of content in a generated response (based on the rankings of the entries from which the multiple pieces of content were derived).

Now turning to FIG. 1, an example environment in which techniques disclosed herein may be implemented is illustrated. The example environment includes a plurality of client computing devices $106_{1-N}$ and an automated personal assistant 120. Although automated personal assistant 120 is illustrated in FIG. 1 as separate from the client computing devices $106_{1-N}$, in some implementations all or aspects of the automated personal assistant 120 may be implemented by one or more of the client computing devices $106_{1-N}$. For example, client computing device $106_1$ may implement one instance or more aspects of automated personal assistant 120 and client computing device $106_N$ may also implement a separate instance of those one or more aspects of automated personal assistant 120. In implementations where one or more aspects of automated personal assistant 120 are implemented by one or more computing devices remote from client computing devices $106_{1-N}$, the client computing devices $106_{1-N}$ and those aspects of automated personal assistant 120 may communicate via one or more networks such as a local area network (LAN) and/or wide area network (WAN) (e.g., the Internet).

The client computing devices $106_{1-N}$ may include, for example, one or more of: a desktop computing device, a laptop computing device, a tablet computing device, a dedicated computing device that enables dialog with users (e.g., a stand-alone device that includes a microphone and speaker, but no display), a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device, a virtual or augmented reality computing device). Additional and/or alternative client computing devices may be provided. In some implementations, a given user may communicate with automated personal assistant 120 utilizing a plurality of client computing devices of the user that collectively form a coordinated "ecosystem" of computing devices. For example, a personal database entry may be generated based on natural language input of a user via a first client computing device and output generated based on that entry in response to further natural language input of the user via a second client computing device. However, for the sake of brevity, many examples described in this disclosure will focus on a given user operating a single one of the client computing devices $106_{1-N}$.

Each of the client computing devices $106_{1-N}$ may operate a variety of different applications, such as a corresponding one of the message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to dialog with automated personal assistant 120 (e.g., implemented on a dedicated computing device that enables dialog with a user), and so forth. In some implementations, one or more of the message exchange clients $107_{1-N}$ may be implemented via a webpage or other resources rendered by a web browser (not depicted) or other application of client computing device 106.

As described in more detail herein, the automated personal assistant 120 receives input from and/or provides output to one or more users via user interface input and output devices of one or more client devices $106_{1-N}$. Implementations described herein relate to the automated personal assistant 120 generating personal database entries for a user based on natural language input provided by the user and generating output for presentation to the user based on one or more generated personal database entries of the user. However, it is understood that in many implementations the automated personal assistant 120 may also perform one or more additional functions. For example, the automated personal assistant 120 may respond to some natural language interface input of a user with output that is generated, in whole or in part, based on information that is not generated based on a personal database entry generated based on past natural language input of the user. For example, the automated personal assistant may utilize one or more documents of public database 154 in generating a response to some natural language interface input of the user. For example, in response to user natural language input of "what does ambidextrous mean?", the automated personal assistant may generate output of "ambidextrous is an adjective that describes the ability to use the right and left hands equally well" based on a definition for "ambidextrous" that is not personal to the user.

In some implementations, user interface input described herein is explicitly directed to the automated personal assistant 120. For example, one of the message exchange clients $107_{1-N}$ may be a personal assistant messaging service dedicated to conversations with automated personal assistant 120 and user interface input provided via that personal assistant messaging service may be automatically provided to automated personal assistant 120. For instance, one of the message exchange clients $107_{1-N}$ and an instance of at least aspects of the personal assistant 120 may both be implemented at least in part on a stand-alone client computing device that at least selectively monitors for voice user interface input and responds with audible user interface output. Also, for example, the user interface input may be explicitly directed to the automated personal assistant 120 via one or more of the message exchange clients $107_{1-N}$ based on particular user interface input that indicates the automated personal assistant 120 is to be invoked. For instance, the particular user interface input may be one or more typed characters (e.g., @PersonalAssistant), user interaction with a virtual button (e.g., a tap, a long tap), a verbal command (e.g., "Hey Personal Assistant"), etc. In some implementations, the automated personal assistant 120 may perform one or more actions in response to user interface input, even when that user interface input is not explicitly directed to the automated personal assistant 120. For example, the automated personal assistant 120 may examine the contents of user interface input and perform one or more actions in response to certain terms being present in the user interface input and/or based on other cues.

Each of the client computing devices $106_{1-N}$ and automated personal assistant 120 may include one or more memories for storage of data and software applications, one or more processors for accessing data and executing applications, and other components that facilitate communication over a network. The operations performed by one or more of the client computing devices $106_{1-N}$ and/or by the automated personal assistant 120 may be distributed across multiple computer systems. Automated personal assistant 120 may be implemented as, for example, computer programs running on one or more computers in one or more locations that are coupled to each other through a network.

Automated personal assistant 120 may include an input processing engine 122, a contextual engine 124, an entry generation engine 126, a searching engine 128, a ranking engine 130, and an output generation engine 132. In some implementations, one or more of engines 122, 124, 126, 128, 130, and/or 132 may be omitted. In some implementations, all or aspects of one or more of engines 122, 124, 126, 128, 130, and/or 132 may be combined. In some implementations, one or more of engines 122, 124, 126, 128, 130, and/or 132 may be implemented in a component that is separate from automated personal assistant 120. For example, one or more of engines 122, 124, 126, 128, 130, and/or 132, or any operative portion thereof, may be implemented in a component that is executed by of the client computing devices $106_{1-N}$.

Input processing engine 122 processes natural language input generated by users via client computing devices $106_{1-N}$ and generates annotated output for use by one or more other components of the automated personal assistant 120. For example, the input processing engine 122 may process natural language free-form input that is generated by a user via one or more user interface input devices of client device $106_1$. The generated annotated output includes one or more annotations of the natural language input and optionally one or more (e.g., all) of the terms of the natural language input.

In some implementations, the input processing engine 122 is configured to identify and annotate various types of grammatical information in natural language input. For example, the input processing engine 122 may include a part of speech tagger configured to annotate terms with their grammatical roles. For example, the part of speech tagger may tag each term with its part of speech such as "noun," "verb," "adjective," "pronoun," etc. Also, for example, in some implementations the input processing engine 122 may additionally and/or alternatively include a dependency parser configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the input processing engine 122 may additionally and/or alternatively include an entity tagger configured to annotate entity references in one or more segments such as references to people, organizations, locations, and so forth. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the input processing engine 122 may additionally and/or alternatively include a coreference resolver configured to group, or "cluster," references to the same entity based on one or more contextual cues. For example, the coreference resolver may be utilized to resolve the term "it" to "bike helmet" in the natural language input "I'm looking for my bike helmet. Do you know where it is?"

In some implementations, one or more components of the input processing engine 122 may rely on annotations from one or more other components of the input processing engine 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the input processing engine 122 may use related prior input and/or other related data outside of the particular natural language input to determine one or more annotations. For example, a first user in a message exchange thread may provide input of "I'll leave the keys under the doormat for you" and a second user may provide, via the message exchange thread, input to the automated messaging system of "Remember that". In processing "Remember that", the coreference resolver may resolve "that" to "I'll leave the keys under the doormat for you" and may further resolve "I'll" to the first user and "you" to the second user.

The contextual engine 124 determines one or more contextual features that are associated with natural language input received from one of the client computing devices $106_{1-N}$. In some implementations, the contextual engine 124 determines one or more of the contextual features independent of terms of the natural language input. For example, contextual feature may indicate a date and/or a time that the natural language input was received and may be determined independent of terms of the natural language input. Also, for example, a contextual feature may indicate a location of the user (e.g., based on GPS or other location data) when the natural language input was received and may be determined independent of terms of the natural language input. Also, for example, a contextual feature may indicate one or more additional users to whom the natural language input was directed and/or one or more additional users who were engaged in communication with the user when the natural language input was received—and may be determined independent of terms of the natural language input. In some implementations, the contextual engine 124 determines one or more of the contextual features independent of any explicit input of the user that provided the natural language input, such as explicit user interface input that defines the contextual features and/or explicit input that confirms automatically determined contextual features are correct.

The entry generation engine 126 generates personal database entries for a user in response to at least some instances of natural language input formulated by the user via a corresponding one of the client computing devices $106_{1-N}$. In generating an entry for received natural language input, the entry generation engine 126 may utilize one or more terms of the natural language input, annotations of the natural language input provided by input processing engine 122, and/or contextual features provided by contextual engine 124.

As one example, assume natural language input of "remember my locker combination is 10, 20, 30" that is formulated by a user via one of the client computing devices $106_{1-N}$ and provided to the automated personal assistant 120. Further assume the contextual engine 124 determines the natural language input is provided at 6:00 AM on May 1, 2016 while the user's location is "at the gym". The user's location of "at the gym" may be defined with any one or more of various levels of granularity, such as a specific latitude/longitude, a street address, an entity identifier that identifies the particular gym, an entity class identifier of "gym", etc. In such an example, the entry generation engine 126 may generate an entry that includes the terms "locker combination is 10, 20, 30"; temporal metadata of: 6:00 AM, "early morning", and/or some other indication of 6:00 AM and temporal metadata of "May $1^{st}$", "Sunday in May", and/or some other identifier of "May 1, 2016"; and locational metadata that is an indication of the user's location of "at the gym."

In some implementations, the entry generation engine 126 may generate a personal database entry based on received natural language input in response to that natural language input having one or more characteristics. For example, in some of those implementations, the entry generation engine 126 may generate a personal database entry in response to natural language input that includes one or more key terms (e.g., "remember", "remember this", and/or "don't forget") and/or that includes those key terms in certain positions of the natural language input (e.g., as a prefix). Also, for example, in some of those implementations, the entry generation engine 126 may additionally and/or alternatively generate a personal database entry in response to providing at least some of natural language input to a classifier trained to predict whether and/or to what degree natural language input indicates a desire for the natural language input to be "remembered"—and receiving, as output from the classifier, an indication that the natural language input indicates a desire to be remembered and/or indicates the desire to at least a threshold degree.

In some implementations, the entry generation engine 126 may also generate "memoryness" metadata for an entry that indicates a likelihood that the natural language input utilized to generate the entry indicates a desire for the automated personal assistant 120 to recall at least some of the natural language input at a later time. For example, the entry generation engine 126 may generate memoryness metadata that is a first value (e.g., "1") when the natural language input includes one or more key terms (e.g., "remember", "remember this", and/or "don't forget") and is a second value (e.g., "0") when the natural language input does not include any of those key terms. Also, for example, the entry generation engine 126 may generate memoryness metadata that is selected from one of three or more values based on one or more characteristics of the natural language input and/or of associated contextual features. For example, the entry generation engine 126 may provide at least some of received natural language input and/or one or more contextual features to a classifier trained to predict whether and/or to what degree natural language input indicates a desire for the natural language input to be "remembered"—and receive, as output from the classifier, a measure of the likelihood that the natural language input indicates a desire for the natural language input to be remembered. The engine 126 may utilize that measure, or another indication based on that measure, as the memoryness metadata.

The personal database entries generated by entry generation engine 126 may be stored in personal database 152. Personal database 152 may be provided on one or more non-transitory computer readable media, such as one or more media that are local to one of the client computing devices $106_{1-N}$, local to the automated personal assistant 120, and/or remote from the client computing devices $106_{1-N}$ and/or the automated personal assistant 120. Each personal database entry of personal database 152 may include the underlying content itself and/or one or more index items that link to the underlying content. In some implementations, the personal database 152 may be local to one of the client computing devices $106_{1-N}$, and that client computing device may implement an instance of one or more (e.g., all) aspects of the automated personal assistant 120. For example, that client computing device may include one or more user interface input devices (e.g., a microphone), one or more user interface output devices (e.g., a speaker), and the personal database 152.

Personal database 152 enables searching of personal database entries to determine whether all or aspects of an entry are relevant to further natural language input of the user as described herein. In some implementations, multiple iterations of personal database 152 may be provided with each iteration being specific to a particular user and may include personal database entries that are accessible to the user and/or system(s) designated by the user and non-accessible to a plurality of additional users and/or systems that differ from the user. For example, the personal database 152 may be accessible only to the user and non-accessible by any other users. Also, for example, the personal database 152 may be accessible to the user and certain additional users designated by the user. In some implementations, the personal database 152 may be associated with access information to allow access to users who are authorized to access such content and prevent access to all other users. In some implementations, the personal database 152 includes personal database entries of a plurality of users, with each entry and/or a group of entries associated with access information to allow access only to users and/or systems who are authorized to access such index items and prevent access to all other users and/or systems. Thus, the personal database 152 may include entries for a plurality of users, but each entry and/or a group of entries may include access information to prevent access by any users not authorized to access such entries. Additional and/or alternative techniques for restricting access to entries of personal database 152 may be utilized.

The searching engine 128 searches entries of personal database 152 that are associated with a user in response to at least some instances of natural language input formulated by the user via a corresponding one of the client computing devices 106$_{1-N}$. The searching engine 128 generates one or more search parameters based on the formulated natural language input, and optionally based on annotations of that input provided by input processing engine 122, and utilizes those search parameters to determine one or more entries of the personal database 152 that include content (e.g., descriptive metadata and/or natural language input terms of those entries) that matches (soft match and/or exact match) one or more (e.g., all) of the search parameters.

A search parameter generated by the searching engine 128 may include, for example, one or more terms of the natural language input, a synonym of one or more terms of the natural language input, a semantic label for one or more terms of the natural language input, a location restriction based on one or more terms of the natural language input, a temporal restriction based on one or more terms of the natural language input, etc. For example, for natural language input of "who did I give my bike helmet to last month?" the searching engine 128 may determine search parameters of "bike helmet" (based on terms of the natural language input), "bicycle helmet" (based on a synonym of the natural language input), a semantic label indicative of "person" (based on presence of "who" in the natural language input), and a temporal restriction corresponding to "last month".

In some implementations, the searching engine 128 searches the personal database 152 based on received natural language input in response to that natural language input having one or more characteristics. For example, in some of those implementations, the searching engine 128 may search the personal database 152 in response to natural language input that includes one or more key terms (e.g., "What", "Who", "Where", "When", "my", and/or "I") and/or that includes those key terms in certain positions of the natural language input. For instance, the search engine may search the personal database 152 in response to natural language input that includes an inquiry term such as "what", "who", or "where" with a syntactical relationship (e.g., as indicated by annotations of the input processing engine 122) to one or more terms such as "I" or "my". Also, for example, in some implementations the searching engine 128 may additionally and/or alternatively search the personal database 152 in response to providing at least some of natural language input to a classifier trained to predict whether and/or to what degree natural language input is intended as a request for personal information from a personal database of the user— and receiving, as output from the classifier, an indication that the natural language input indicates a desire and/or indicates a desire to at least a threshold degree.

In some implementations, the searching engine 128 may also search the public database 154 in response to at least some instances of natural language input formulated by the user via a corresponding one of the client computing devices 106$_{1-N}$. The searching engine 128 may search both the public database 154 and the personal database 152 in response to some natural language input and/or may search only one of the public database 154 and the personal database 152. Generally, the public database 154 may include various types of content that are not restricted to the user and/or to other user's and/or systems designated by the user, and that may optionally be utilized by the searching engine 128 to respond to various types of natural language input. For example, the public database 154 may include content items from publicly accessible documents on the World Wide Web, scripted responses to certain natural language input, etc. As one example, the public database 154 may include a definition for "ambidextrous" to enable the searching engine 128 to identify that definition in response to natural language input of "what does ambidextrous mean?". As another example, the public database 154 may include a scripted response of "Hello, how are you" that is identified by the searching engine 128 in response to natural language input of "Hi" or "Hello".

The ranking engine 130 optionally ranks one or more entries (personal and/or public) identified by the searching engine 128 based on one or more criteria. In some implementations, the ranking engine 130 optionally calculates a score for each of one or more entries that are responsive to the query using the one or more criteria. The score of an entry may itself be used as the ranking for the entry, or may be compared to scores of other entries (where other entries are determined) to determine the ranking of the entry. Each criteria used to rank an entry provides information about the entry itself and/or the relationship between the entry and the natural language input.

In some implementations, the ranking of a given entry may be based on conformance of a semantic label of descriptive metadata of the entry to a semantic label generated for the natural language input. For example, if a semantic label for one or more terms of the natural language input matches a semantic label in descriptive metadata of the given entry, the ranking of the given entry may be positively influenced.

In some implementations, the ranking of the given entry may additionally and/or alternatively be based on conformance of locational metadata of the given entry to a current location of the user (e.g., determined by contextual engine 124) when the natural language input was received. For example, if a current location of the user is the same as, or within a threshold distance of, a location indicated by locational metadata of the given entry, the ranking of the given entry may be positively influenced.

In some implementations, the ranking of the given entry may additionally and/or alternatively be based on conformance of temporal metadata of the given entry to a current date and/or time (e.g., determined by contextual engine 124) when the natural language input was received. For example, if a current date is within a threshold of a date indicated by temporal data of the given entry, the given entry may be promoted more than if the current date was not within the threshold.

In some implementations, the ranking of the given entry may additionally and/or alternatively be based on memoryness metadata for the given entry. For example, if a measure included in or defined by the memoryness metadata satisfies a threshold, the ranking of the given entry may be promoted more than if the measure did not satisfy the threshold. In some implementations where the searching engine 128 identifies a first entry from the public database 154 and a second entry from the personal database 152, the rankings of the entries may be based on whether and/or to what degree the natural language input is intended as a request for personal information from a personal database of the user (e.g., as described above with respect to searching engine 128). For example, if characteristics of the natural language input indicate it is highly likely to be a request for personal information from a personal database of the user, any identified entries from the public database 154 may be demoted.

The output generation engine 132 utilizes content of one or more entries identified by searching engine 128, and optionally the rankings of those entries determined by ranking engine 130, to generate output for presentation to the user as a response to the provided natural language input. For example, the output generation engine 132 may select a subset (e.g., one) of identified entries based on the ranking and may generate output based on the selected subset. Also, for example, the output generation engine 132 may additionally and/or alternatively utilize the ranking to determine a presentation order of multiple pieces of content in a generated response (based on the rankings of the entries from which the multiple pieces of content were derived).

In generating output based on a given personal database entry, the output generation engine 132 may include one or more of the terms of the given entry that are from the natural language input for which the given entry was generated and/or may include output that is based on generated descriptive metadata for the entry.

Turning now to FIGS. 2A and 2B, additional description is provided of various components of automated personal assistant 120.

In FIG. 2A, a user utilizes one or more user interface input devices of the computing device $106_1$ to provide natural language input 201A to message exchange client $107_1$, which transmits the natural language input 201A to input processing engine 122. The natural language input 201A may be free-from input as described herein and may be, for example, typed input provided by the user via a physical or virtual keyboard of a computing device or spoken input provided by the user to a microphone of the computing device. In implementations where the natural language input 201B is spoken input, it may optionally be transcribed to textual input by the computing device and/or by the input processing engine 122.

The input processing engine 122 processes the natural language input 201A and generates various annotations of the natural language input. The input processing engine 122 provides annotated input (e.g., terms of the natural language input 201A and generated annotations) 202A to entry generation engine 126.

The contextual engine 124 determines contextual features associated with receiving the natural language input 201A. For example, the contextual engine 124 may determine the contextual features based on data provided by message exchange client $107_1$ (e.g. a timestamp, locational data) and/or other applications and/or the operating system of the client computing device $106_1$. In some implementations, the contextual features 204 may be utilized by the entry generation engine 126 as described below and/or may be utilized by the input processing engine 122 (e.g., to improve entity resolution and/or other determinations based on user location and/or other contextual features).

The entry generation engine 126 generates a personal database entry 203 for a user and stores it in personal database 152. In generating the entry 203, the entry generation engine 126 may utilize one or more terms of the natural language input 201A, annotated input 202A of the natural language input provided by input processing engine 122, and/or contextual features 204 provided by contextual engine 124.

FIG. 2B illustrates an example of generating, based on one or more personal database entries of a user, natural language output that is responsive to further free-form natural language input of the user. The example of FIG. 2B may occur subsequent to the example of FIG. 2A and may utilize the entry 203 generated in FIG. 2B.

In FIG. 2B, a user utilizes one or more user interface input devices of the computing device $106_1$ to provide further natural language input 201B to message exchange client $107_1$, which transmits the natural language input 201B to input processing engine 122. The natural language input 201B may be free-from input as described herein and may be, for example, typed input provided by the user via a physical or virtual keyboard of a computing device or spoken input provided by the user to a microphone of the computing device.

The input processing engine 122 processes the natural language input 201A and generates various annotations of the natural language input. The input processing engine 122 provides annotated output (e.g., terms of the natural language input 201B and generated annotations) 202B to searching engine 128.

The searching engine 128 generates one or more search parameters based on the annotated input 202B, and utilizes those search parameters to determine one or more entries of the personal database 152 and/or public database 154 that include content that matches one or more of the search parameters. As described herein, in some implementations the searching engine 128 may search only personal database 152 in response to the natural language input 201B based on one or more characteristics of the natural language input 201B. The searching engine 128 determines that entry 203 of personal database 152 is responsive to the search based on matching one or more search parameters to content of the entry 203.

The searching engine 128 provides the entry 203 to the ranking engine 130, which optionally generates a ranking for the entry 203. For example, the ranking engine 130 may determine if a ranking score for the entry 203 satisfies a threshold that warrants the output generation engine 132 utilizing the entry 203 to generate natural language output 205. The contextual engine 124 determines contextual features associated with receiving the natural language input 201B and may provide those contextual features to the ranking engine 130 for use in generating a ranking as described herein. In some implementations where the searching engine 128 determines multiple responsive entries, the ranking engine 130 may rank those relative to one another.

The output generation engine 132 utilizes content of the entry 203 to generate natural language output 205 for presentation to the user as a response to the natural language input 201B. For example, the output generation engine 132 may generate output 205 that includes one or more of the terms of the entry 203 that are from the natural language input 201A and/or that includes one or more terms that are based on generated descriptive metadata for the entry 203. The natural language output 205 is provided to the message exchange client $107_1$ for audible and/or visual presentation to the user via a user interface output device of the client computing device $106_1$. In some implementations where searching engine 128 identifies multiple responsive entries, the output generation engine 132 may select a subset (e.g., one) of identified entries based on the ranking and may generate output based on the selected subset. Also, for example, the output generation engine 132 may additionally and/or alternatively utilize the ranking to determine a presentation order of multiple pieces of content in a generated response (based on the rankings of the entries from which the multiple pieces of content were derived).

Figure 3A:
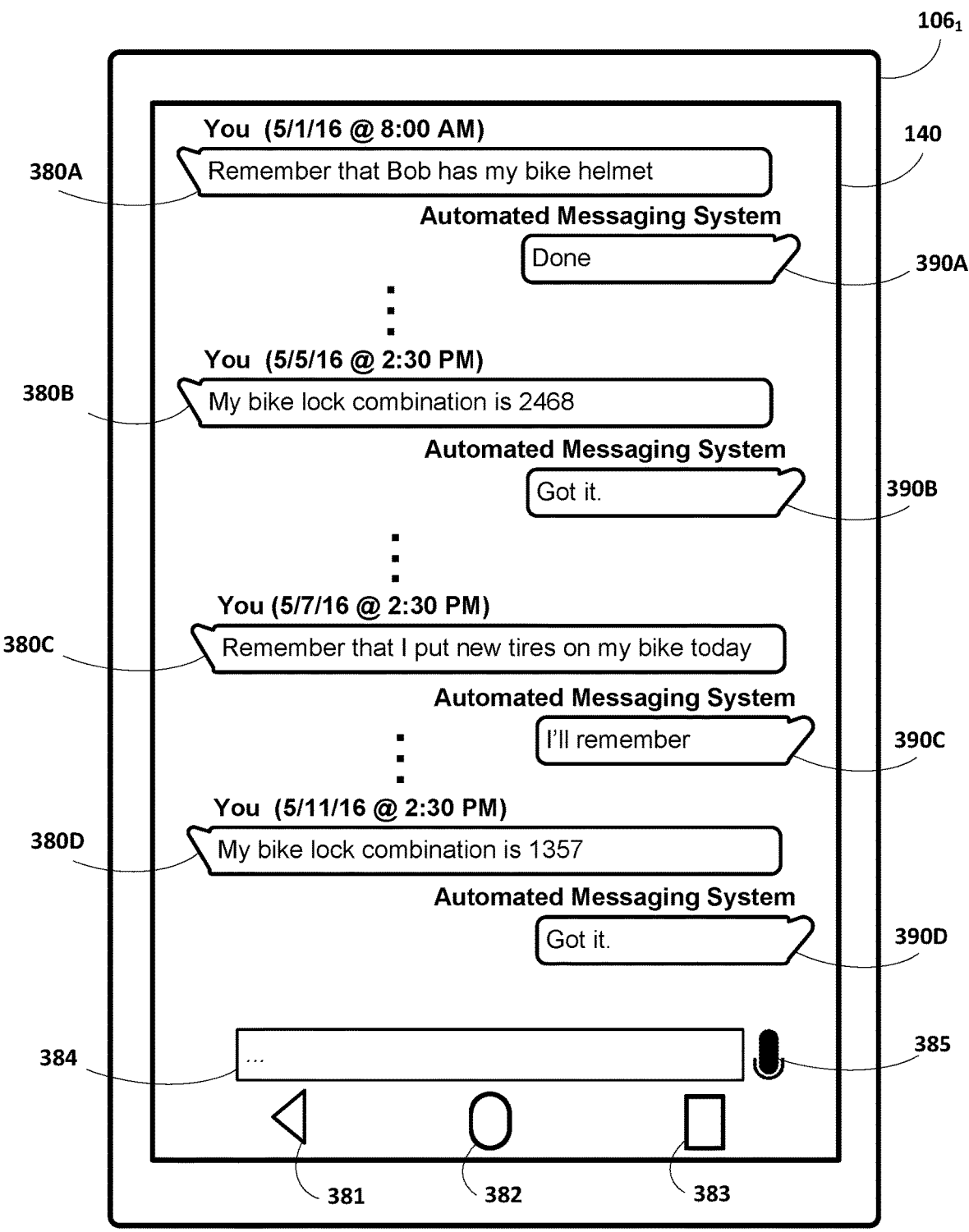
FIG. 3A illustrates an example client computing device with a display screen displaying an example of dialog that may occur between a user of the client computing device and an automated personal assistant according to implementations described herein.

Turning now to FIGS. 3A-3G, additional description is provided of various components and techniques described herein. FIG. 3A illustrates the client computing device $106_1$ of FIG. 1 with a display screen 140 displaying an example of dialog that may occur between a user of the client computing device $106_1$ and the automated personal assistant 120 according to implementations described herein. In particular, the dialog includes natural language input 380A, 380B, 380C provided by the user to an automated personal assistant and responses 390A, 390B, 390C that may optionally be provided by the automated personal assistant 120 to confirm the assistant has generated an entry in response to the inputs.

In some other implementations, alternative response may be provided by the automated personal assistant 120. For example, in some implementations where clarification of a natural language input may be necessary and/or beneficial in determining a more particularized entry, the automated personal assistant may respond with a prompt to seek such further clarification. For instance, in response to natural language input 380A, the automated personal assistant 120 may identify both a "Bob Smith" and "Bob White" in contact entries of the user and may generate a prompt such as "Do you mean Bob Smith or Bob White?" to solicit further input from the user to enable determination of a particular contact and further tailoring of an entry based on the input 380A. Also, for instance, in response to natural language input 380D, the automated personal assistant 120 may determine that the input 380D conflicts with previous input 380B, and the assistant 120 might prompt "Should this replace the bike lock combination you provided on May 5, 2016?" to determine if an entry generated based on the input 380D should replace an entry generated based on the input 380B.

FIG. 3A also shows, in parentheses, a date and a time that the user provided each of the various inputs 380A-D. As described herein, the dates and times may be utilized in generating descriptive metadata. The dates and/or times may optionally not be shown in the display provided to the user, but are illustrated in FIG. 3A for purposes of clarity.

The display screen 140 further includes a textual reply interface element 384 that the user may select to generate user input via a virtual keyboard and a voice reply interface element 385 that the user may select to generate user input via a microphone. The display screen 140 also includes system interface elements 381, 382, 383 that may be interacted with by the user to cause the computing device $106_1$ to perform one or more actions.

FIGS. 3A, 3B, 3C, 3D, 3E, 3F, and 3G each illustrates a portion the example client computing device $106_1$, with the display screen 140 displaying dialog that may occur subsequent to the dialog of FIG. 3A according to implementations described herein.

Figure 3B:
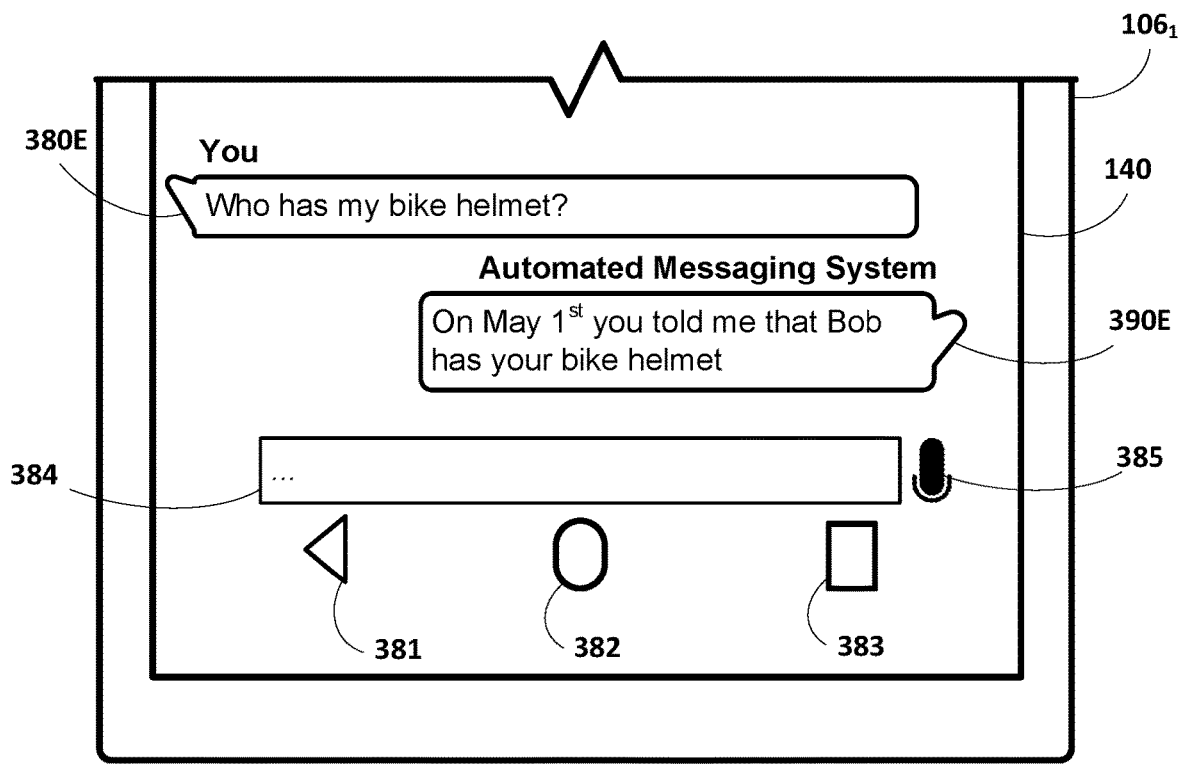
FIGS. 3B, 3C, 3D, 3E, 3F, and 3G each illustrates a portion the example client computing device of FIG. 3A, with the display screen displaying dialog that may occur subsequent to the dialog of FIG. 3A according to implementations described herein.

In FIG. 3B the user provides, at a later time, further natural language input 380E of "who has my bike helmet?". The automated personal assistant 120 provides a response 390E of "On May $1^{st}$ you told me that Bob had your bike helmet." The response 390E may be generated by: issuing a search based on "where is my bike helmet"; identifying, as responsive to the search, an entry that was created based on the user input 380A of FIG. 3A; and using that entry to generate the response 390E. For example, an entry generated for user input 380A may include the terms "Bob has my bike helmet" and descriptive metadata of: a semantic label of "person" associated with "Bob", a semantic label of "object" associated with "bike helmet", and temporal metadata indicating May $1^{st}$ and/or 8:00 AM. Also, for example, a search may be issued based on the user input 380E, such as a search that includes a first search parameter of "bike helmet" and a second search parameter of a semantic label of "person" (based on presence of "who" in the user input 380E). The entry for input 380A may be identified based on having terms that match the first search parameter and a sematic label that matches the second search parameter. The response 390E may be generated to include temporal metadata from the entry for input 380A ("On May $1^{st}$") and the text from the entry for input 380A ("Bob has your Bike helmet").

Figure 3C:
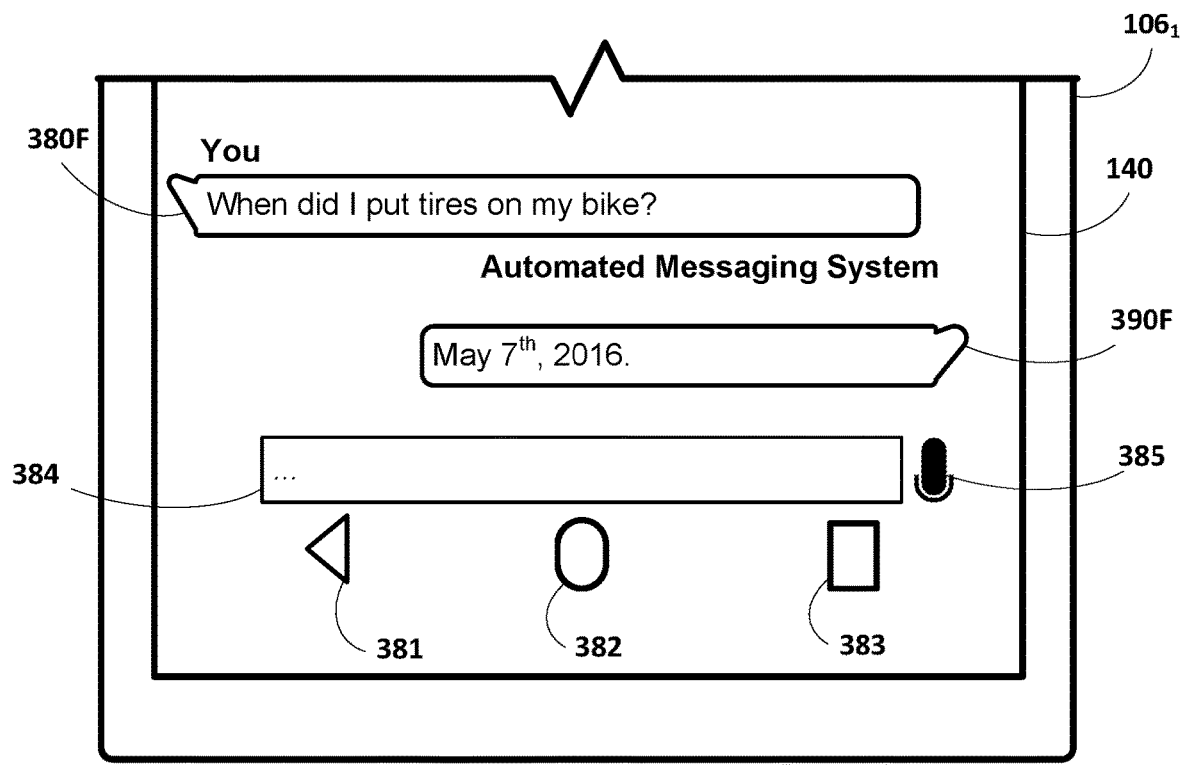

In FIG. 3C the user provides, at a later time, further natural language input 380F of "when did I put tires on my bike?". The automated personal assistant provides a response 390F of "May 7, 2016" The response 390F may be generated by: issuing a search based on "when did I put tiers on my bike"; identifying, as responsive to the search, an entry that was created based on the user input 380B of FIG. 3A; and using that entry to generate the response 390F. For example, an entry generated for user input 380B may include the terms "put new tires on my bike on May 7, 2016". The entry may include the terms "May 7, 2016" instead of "today" (which is provided in the user input 380B) based on entry generation engine 126 replacing "today" with the date the user input 380B was received (e.g., based on annotations provided by input processing engine 122). The entry generated for user input 380B may also include descriptive metadata of: temporal metadata indicating May 7, 2016 and a semantic label of "when" associated with the terms "May 7, 2016" of the entry. Also, for example, a search may be issued based on the user input 380F, such as a search that includes a first search parameter of "tires", a second search parameter of "bike", and a third search parameter of a semantic label of "when" (based on presence of "when" in the user input 380F). The entry generated for input 380B may be identified based on having terms that match the first search parameter and the second search parameter and having semantic label metadata that matches the third search parameter. The response 390F may be generated to include only the terms "May 7, 2016" from the entry for input 380B based on those terms being associated with the semantic label metadata that matches the third search parameter.

Figure 3D:
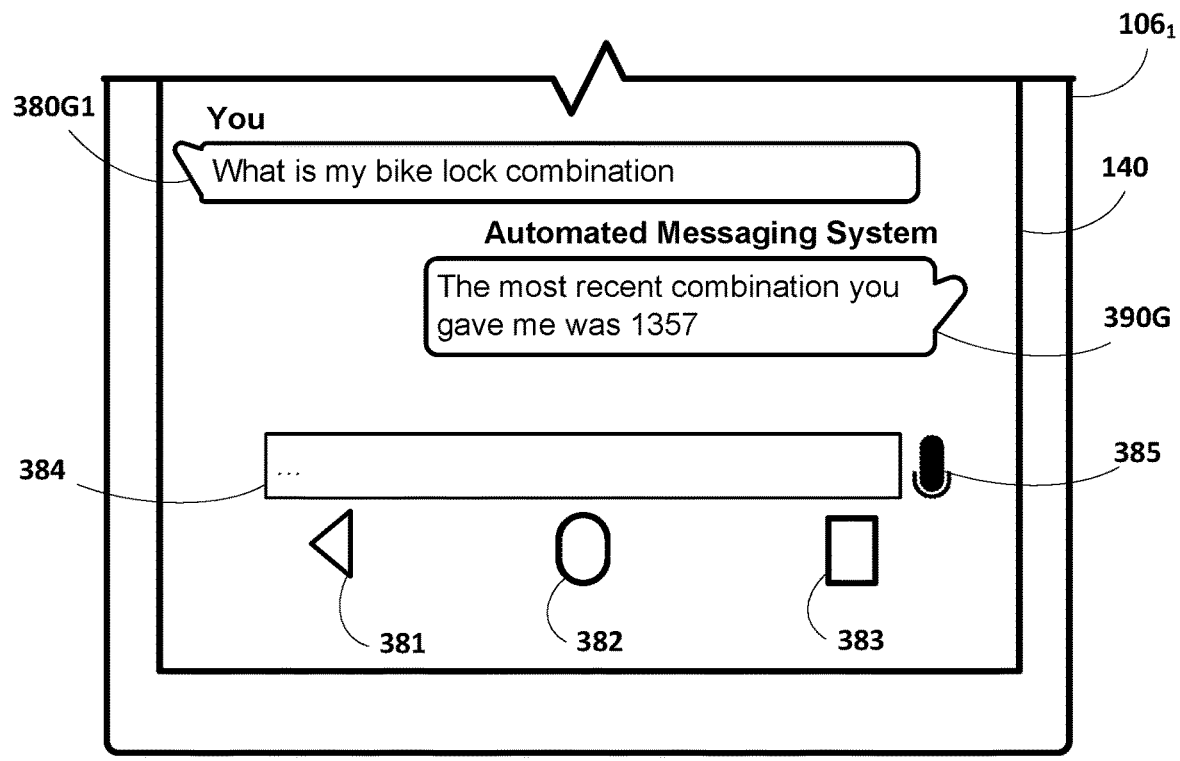
Figure 3E:
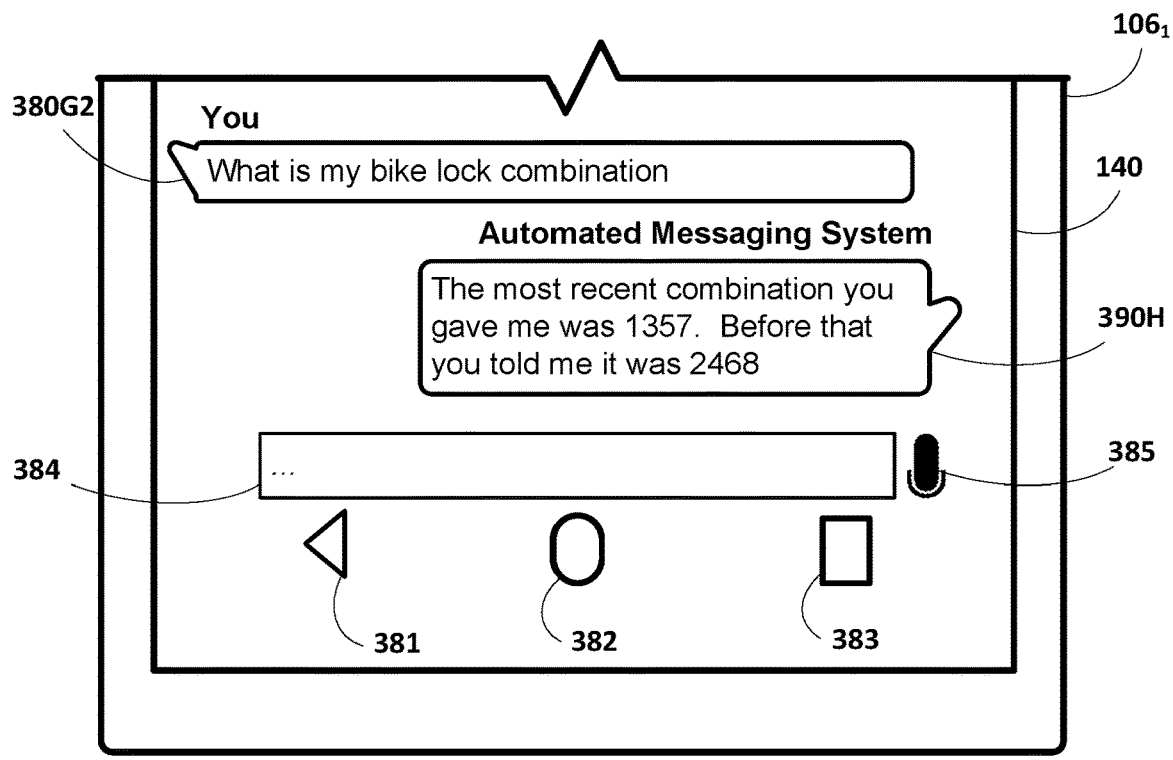

FIGS. 3D and 3E illustrate further natural language inputs 380G1 and 380G2 of "What is my bike lock combination". A first entry generated for user input 380B (FIG. 3A) and a second entry generated for user input 380D (FIG. 3A) may both identified based on a search for natural language inputs 380G1, 380G2. In FIG. 3D, a response 390G that is generated based on the second entry for user input 380D is provided without providing any output that is generated based on the first entry for user input 380B. This may be based on ranking the first entry and the second entry based on one or more criteria and determining the second entry is ranked higher than the first entry. For example, the second entry may be ranked higher based on temporal metadata for the second entry being more proximal to a current time than temporal metadata for the first entry.

In the example of FIG. 3D, the response 390G is generated based on the second entry for user input 380D without providing any output that is generated based on the first entry for user input 380B. Providing the content from only one of the two answers may be based on various factors such as system settings, size of the display screen 140, and/or based on processing of input 380G1 to understand that only a single answer is desired. However, in some implementations a response may include output generated based on both the first entry and the second entry.

For example, in FIG. 3E a response 390H is generated that is based on both the second entry for user input 380D and the first entry for user input 380B. In the response 390H, the portion of the response 390H that corresponds to the second entry is presented before the portion based on the first entry. This may be based on, for example, the ranking of the second entry being higher than the ranking of the first entry (e.g., based on temporal metadata for the second entry being more proximal to a current time than temporal metadata for the first entry).

Figure 3F:
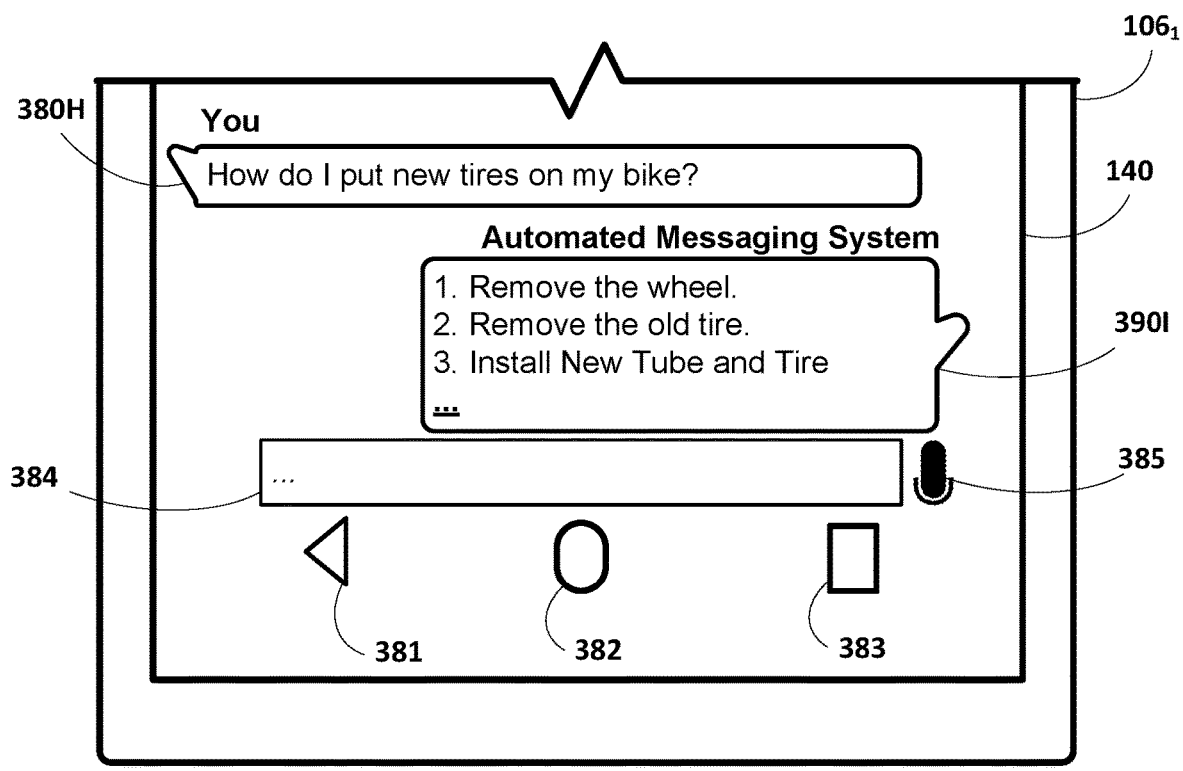

In FIG. 3F the user provides, at a later time, further natural language input 380H of "How do I put tires on my bike?". The automated personal assistant 120 provides a response 390I that includes part of the steps for putting new tires on a bike. The response 390I is an example of a response that may be generated by the automated personal assistant 120 based on a public entry of public database 154. Although the further natural language input 380H includes the terms "tires" and "bikes" that may also be included in a personal entry generated based on the user input 380C (FIG. 3A), the automated personal assistant 120 does not provide responsive content that is based on the personal entry. This may be based on one or more of various factors. For example, a semantic label for the input 380H (e.g., a label associated with "How") may not match a semantic label for the personal entry generated based on the user input 380C. This may lead to that entry not being determined and/or may negatively influence the ranking of that entry. As another example, the ranking for the public entry utilized to generate response 390I may be higher than the ranking of the personal entry—and the response 390I generated based on only the public entry based on a rule that dictates responses are to be generated based on only the highest ranked entry and/or based on only the highest ranked entry when its ranking score satisfies a threshold relative to the next highest ranked entry.

Figure 3G:
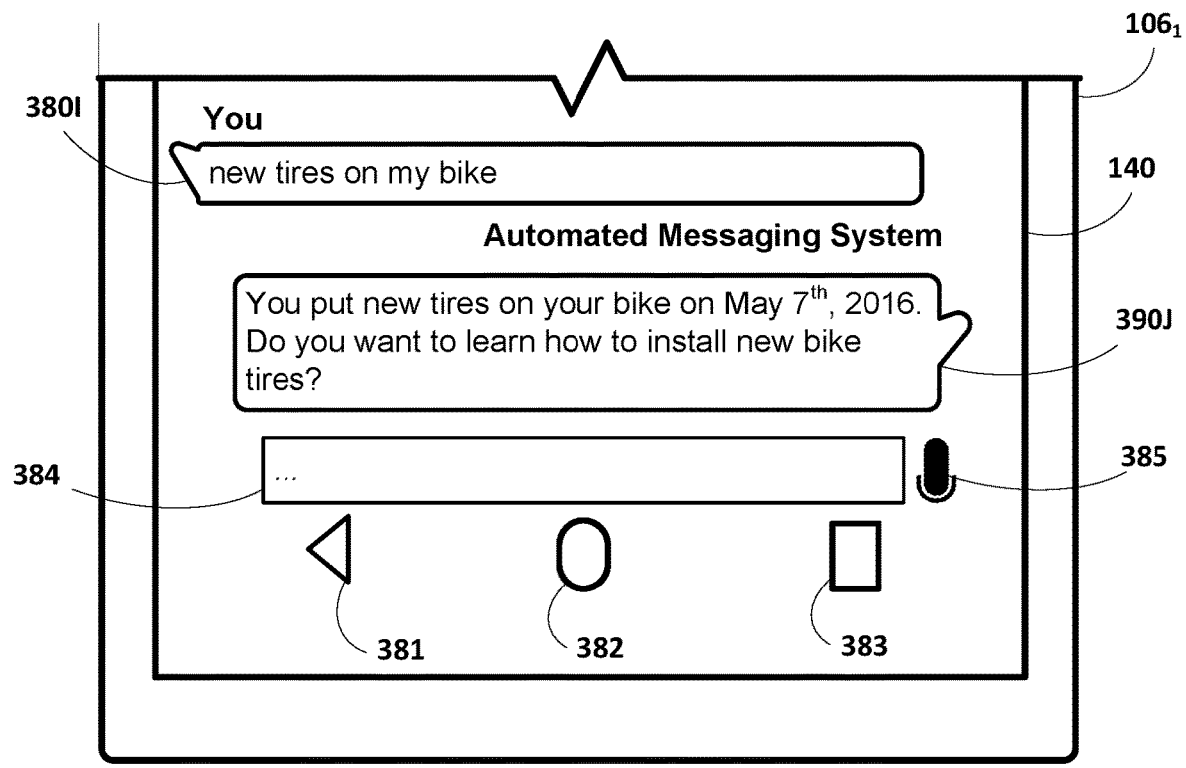

In FIG. 3G the user provides, at a later time, further natural language input 380I of "new tires on my bike?". The automated personal assistant 120 provides a response 390J that includes content from a private database entry and content from a public database. In particular, the response 390J includes content ("You put new tires on your bike on May 7, 2016") that is based on a personal entry generated for the input 380C (FIG. 3A). The response 390J also includes content ("Do you want to learn how to install new bike tires?") that may be based on a public entry of public database 154. The automated personal assistant 120 may include content that is based on an entry generated for the input 380C based on matching search parameters of "new" "tires" and "bike" to content of the entry. In some implementations, the content from the private database entry may be presented before the content from the public database based on a ranking of the entries underlying the content.

Figure 4A:
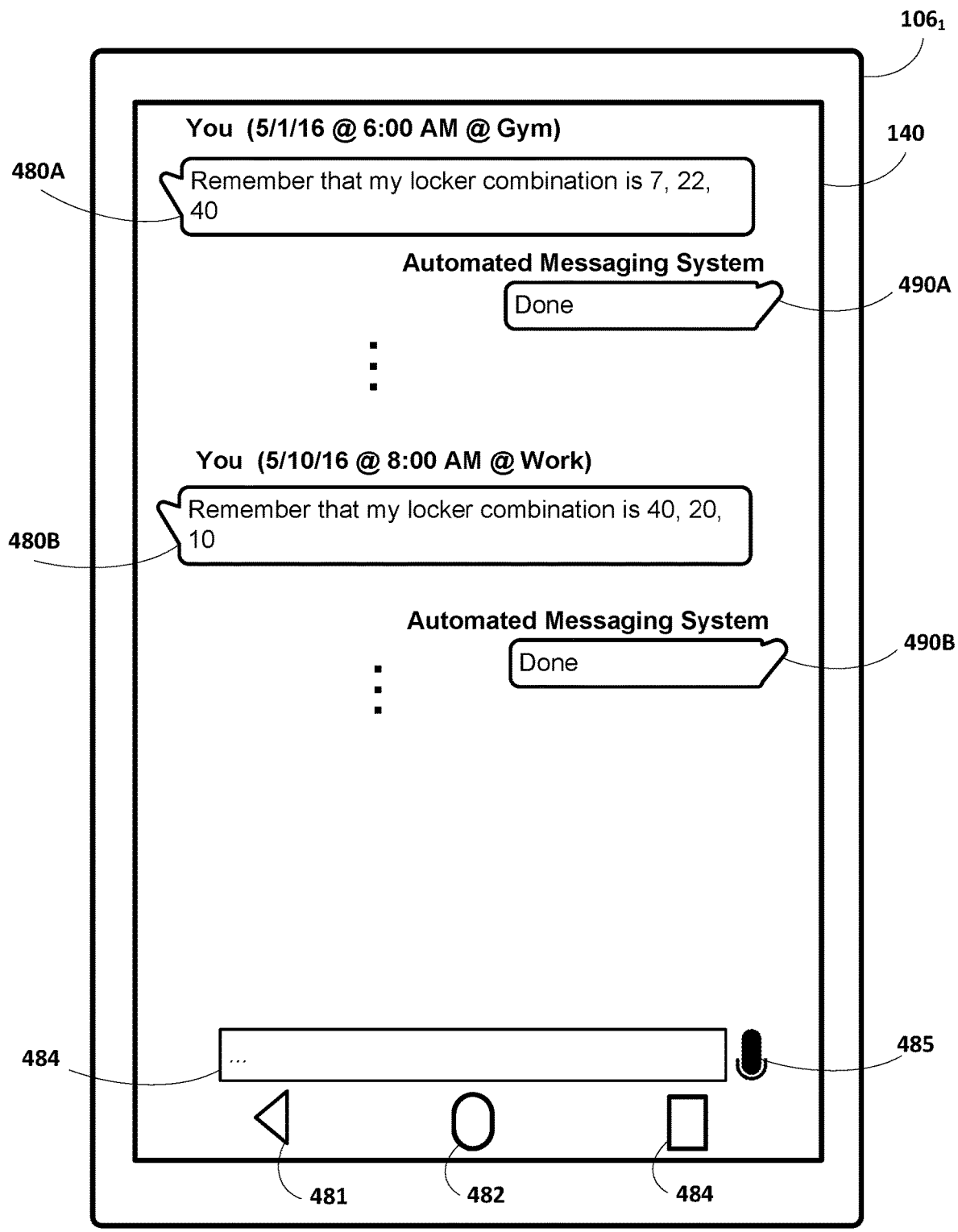
FIG. 4A illustrates the client computing device of FIG. 3A with the display screen displaying another example of dialog that may occur between the user of the client computing device and the automated personal assistant according to implementations described herein.

FIG. 4A illustrates the client computing device $106_1$ with the display screen 140 displaying another example of dialog that may occur between the user of the client computing device $106_1$ and the automated personal assistant 120 according to implementations described herein. In particular, the dialog includes natural language inputs 480A and 480B provided by the user to the automated personal assistant 120 and responses 490A and 490B that may optionally be provided by the automated personal assistant 120 to confirm the assistant 120 has generated an entry in response to the inputs. FIG. 4A also shows, in parentheses, a date and a time that the user provided each of the inputs 480A and 480B. As described herein, the dates and times may be utilized in generating descriptive metadata. The dates and/or times may optionally not be shown in the display provided to the user, but are illustrated in FIG. 4A for purposes of clarity.

The display screen 140 further includes a textual reply interface element 484 that the user may select to generate user input via a virtual keyboard and a voice reply interface element 485 that the user may select to generate user input via a microphone. The display screen 140 also includes system interface elements 481, 482, 483 that may be interacted with by the user to cause the computing device $106_1$ to perform one or more actions.

Figure 4B:
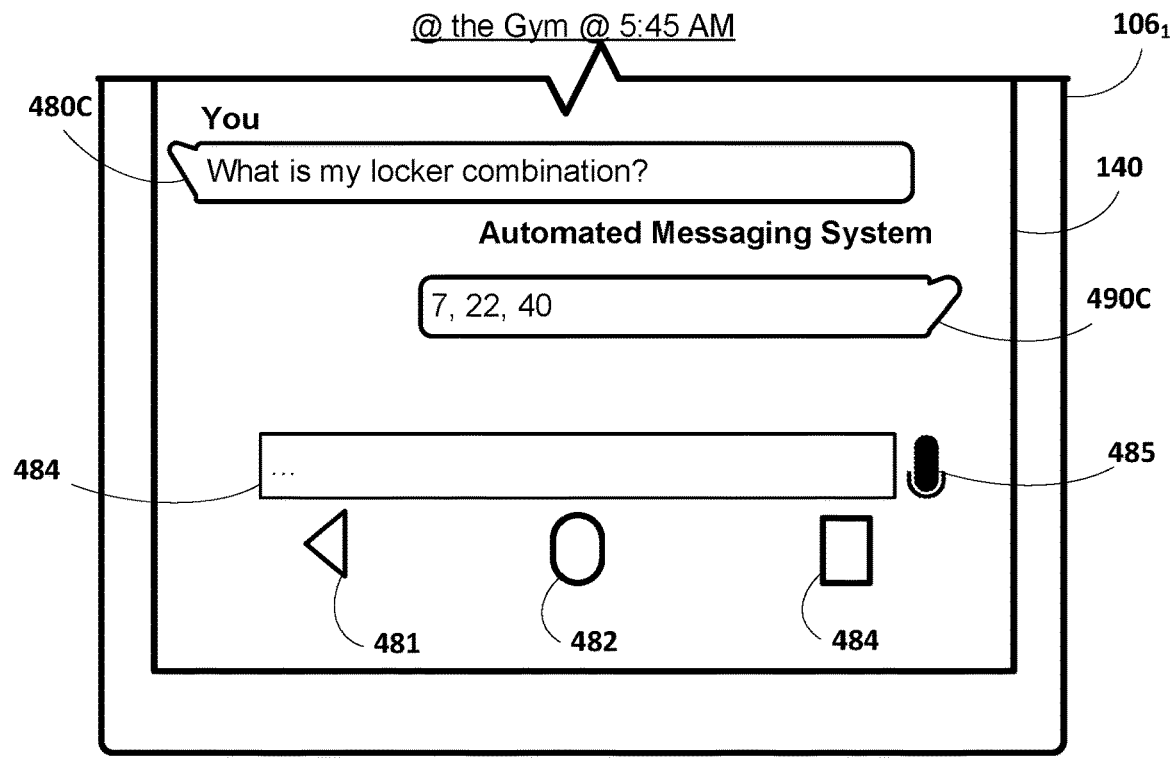
FIGS. 4B and 4C each illustrates a portion the example client computing device of FIG. 4A, with the display screen displaying dialog that may occur subsequent to the dialog of FIG. 4A according to implementations described herein.

In FIG. 4A, the user provides first user input 480A that includes "my locker combination is 7, 22, 40" and provides it at the "Gym" on "May 1, 2016" at "6:00 AM". A first entry may be created for the first user input that includes one or more terms from the input, includes locational metadata indicative of the "Gym", and that includes temporal metadata indicative of May 1, 2016 and/or 6:00 AM. In FIG. 4B, the user provides second user input 480B that includes "my locker combination is 40, 20, 10" and provides it at "Work" on "May 10, 2016" at "8:00 AM". A second entry may be created for the first user input that includes one or more terms from the input, includes locational metadata indicative of "Work", and that includes temporal metadata indicative of May 10, 2016 and/or 8:00 AM.

Figure 4C:
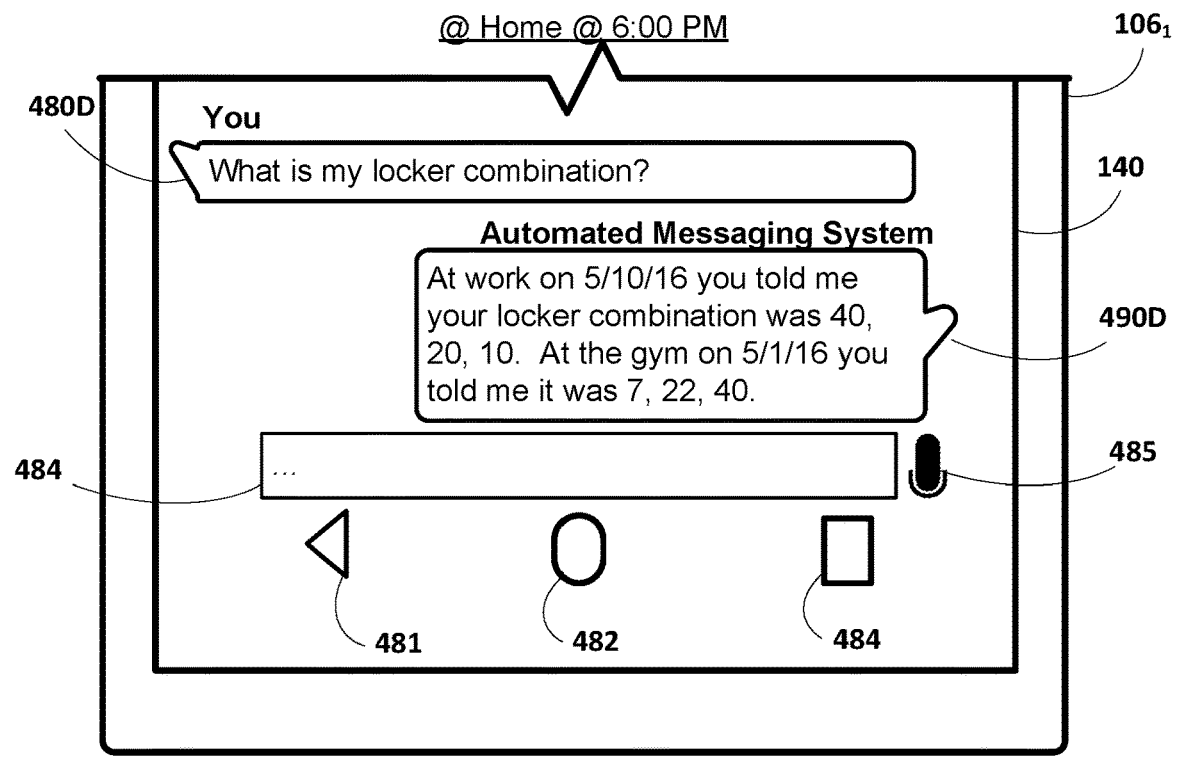

FIGS. 4B and 4C each illustrates a portion the example client computing device $106_1$ with the display screen 140 displaying dialog that may occur subsequent to the dialog of FIG. 4A according to implementations described herein.

In FIG. 4B, the user provides further input 480C of "What is my locker combination?" and provides it at 5:45 AM while the user is at the Gym. The automated personal assistant 120 provides a response 490C that is generated based on the first entry for the user input 480A of FIG. 4A—and that does not include any content generated based on the second entry for the user input 480B. This may be based on, for example, conformance of the locational metadata of the first entry to the current location of the user and/or conformance of the temporal metadata to a current time. Compare this to a situation where the user was at "Work" at "8:00 AM". In such a situation the response may be generated based on the second entry and independent of the first entry.

In FIG. 4C, the user provides further input 480D of "What is my locker combination?" that is the same as the input 480C of FIG. 4B. However, in FIG. 4C the user provides the input 480D at 6:00 PM while the user is at "Home". The automated personal assistant 120 provides the response 490D that is generated based on both the first entry for the user input 480A of FIG. 4A—and the second entry for the user input 480B. Generating a response based on both entries instead of just one may be based on, for example, the user's current location not conforming strongly to the locational metadata of either of the entries and/or the current time not conforming strongly to the temporal metadata of either of the entries. In response 490D, content generated based on the second entry may be presented before content generated based on the first entry based on the date of temporal metadata of the second entry being more proximal to the current date than that of the first entry.

Although FIGS. 3A-3G and 4A-4C illustrate example graphical user interfaces that may be provided to a user, it is understood that in various implementations responses provided by automated personal assistant 120 may be provided for presentation audibly (e.g., via a speaker), without necessarily providing graphical indications of those responses. For example, a user may provide natural language input via a microphone and the automated personal assistant 120 may respond to such input with output that is configured for presentation audibly.

Figure 5A:
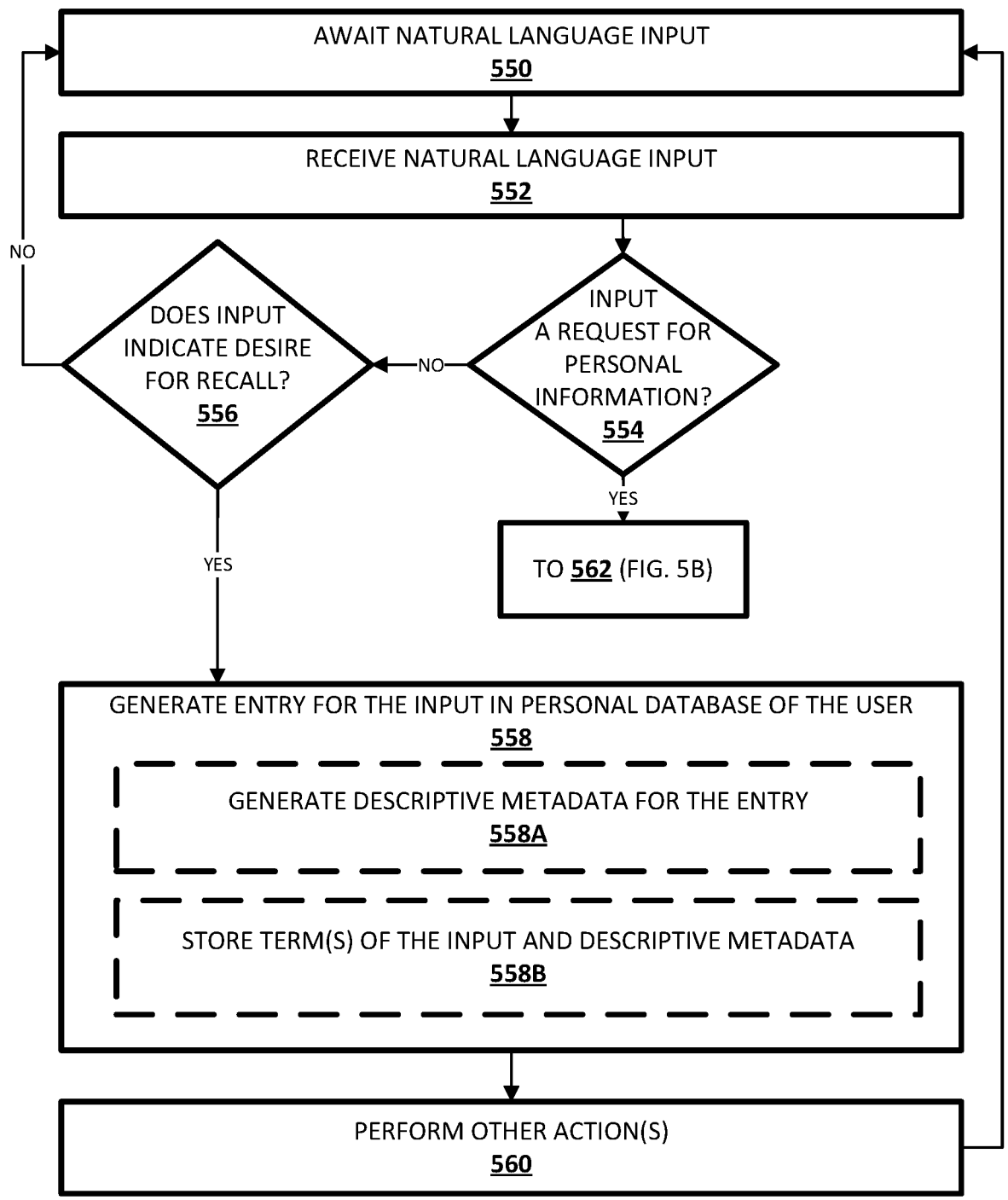
FIGS. 5A and 5B present a flow chart illustrating an example method of generating personal database entries for a user based on free-form natural language input formulated by the user and generating, based on one or more of the personal database entries, natural language output that is responsive to further free-form natural language input of the user.
Figure 5B:
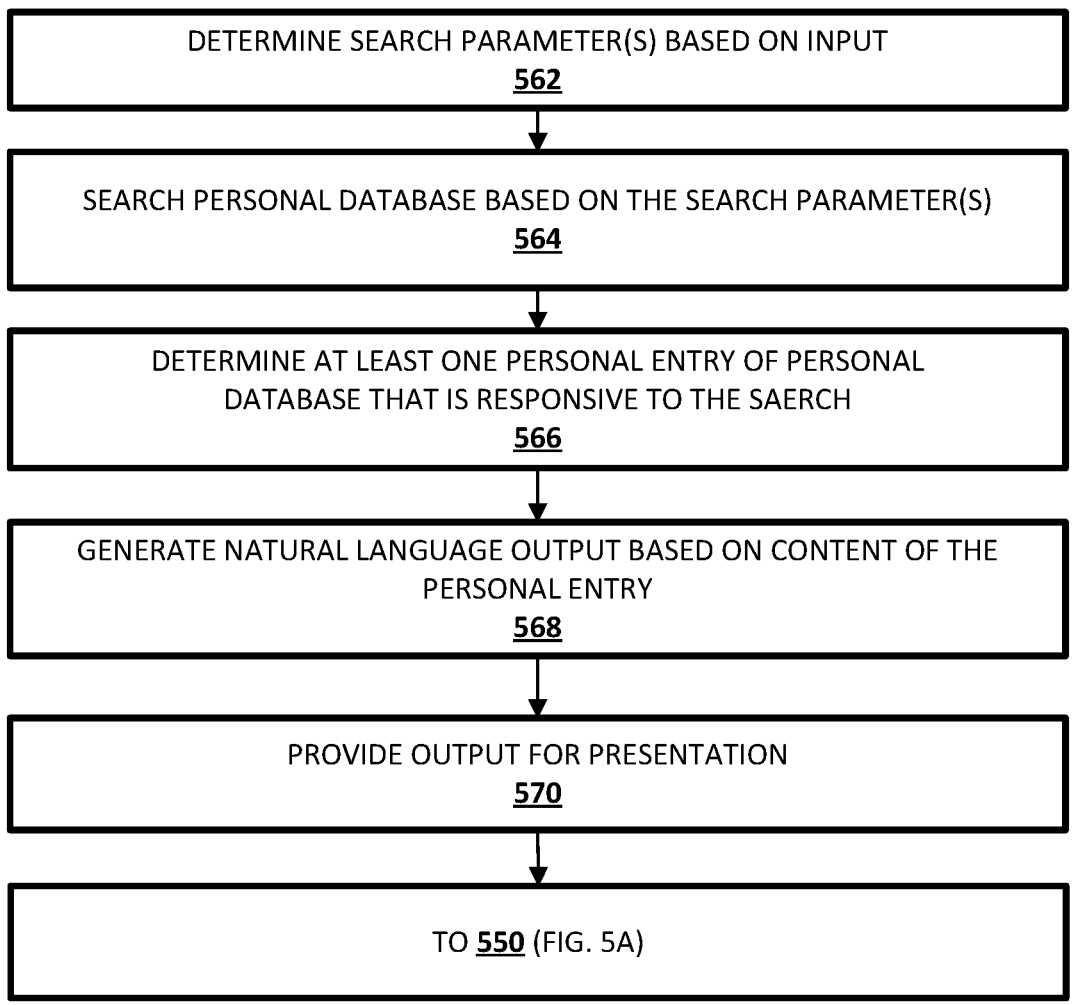

FIGS. 5A and 5B present a flowchart illustrating an example method 500 of generating personal database entries for a user based on free-form natural language input formulated by the user and generating, based on one or more of the personal database entries, natural language output that is responsive to further free-form natural language input of the user. For convenience, the operations of the flow chart are described with reference to a system that performs the operations. This system may include various components of various computer systems, such as automated personal assistant 120. Moreover, while operations of method 500 are shown in a particular order, this is not meant to be limiting. One or more operations may be reordered, omitted or added.

At block 550, the system awaits natural language input.

At block 552, the system receives natural language input that is formulated by a user via one or more user interface input devices.

At block 554, the system determines whether the natural language input of block 552 indicates a request for personal information, such as a request for personal information from a personal database of the user. For example, in some implementations, the system may determine the input indicates a request for personal information if it includes one or more key terms (e.g., "What", "Who", "Where", "my", "I" and/or "don't forget") and/or that includes those key terms in certain positions of input. Also, for example, in some implementations the system may additionally and/or alternatively y determine the input indicates a request for personal information based on output received in response to providing at least some of input to a classifier trained to predict whether and/or to what degree natural language input is intended as a request for personal information. In some implementations, block 554 may be omitted (e.g., one or more of blocks 562-570 may be performed for each input) or instantiated (for the first time or again) after one or more of blocks 562-570 (e.g., the decision of block 554 may be based on whether any entries are determined at block 570 and/or may be based on the content and/or ranking of any returned entries).

If the system determines the natural language input of block 552 does not indicate a request for information, the system proceeds to block 556 where the system determines whether the input indicates a desire for recall. For example, in some implementations the system may determine the input indicates a desire for recall based on the presence of certain terms in the input (e.g., "remember", "don't forget") and/or based on output received in response to providing the input to a classifier trained to predict whether and/or to what degree natural language input indicates a desire for the natural language input to be "remembered." In some implementations, block 556 may be omitted. For example, one or more of blocks 558 and 560 may be performed for each input or for each input that is determined not to indicate a request for personal information at block 554 and/or that satisfies one or more other criteria.

If the system determines at block 556 the input does not indicate a desire for recall, the system proceeds back to block 550 and awaits further natural language output, optionally after providing an error output (e.g., "I don't understand your request") and/or proceeding to other unillustrated blocks (e.g., blocks for searching a public database and/or providing other output).

If the system determines at block 556 that the natural language input of block 552 does indicate a desire for recall, the system proceeds to block 558 where the system generates an entry for the input of block 552 in a personal database of the user.

In some implementations, in performing block 558, the system generates descriptive metadata for the entry at block 558A (e.g., based on terms of the input and/or contextual features associated with receiving the input) and stores one or more terms of the input of block 552 and the generated descriptive metadata in the entry at block 558B. The system may then optionally perform one or more other actions at block 560, such as providing output that confirms an entry has been generated for the input, then proceeds back to block 550.

Returning back to block 554, if the system determines at block 554 that the input of block 552 does indicate a request, the system proceeds to block 562 (FIG. 5B)

At block 562, the system determines one or more search parameters based on the input of block 552. At block 564, the system searches a personal database of the user based on the search parameters determined at block 562.

At block 566, the system determines at least one personal entry of the personal database that is responsive to the search. At block 568, the system generates natural language output based on content of the at least one personal entry determined at block 566. In some implementations, the system may generate output based on a personal entry only when a ranking for that personal entry satisfies a threshold. The ranking may be for the personal entry itself, or for the personal entry relative to one or more other personal entries that may be determined at block 566 to be responsive to the search.

At block 570, the system provides the output of block 568 for presentation to the user via one or more user interface output devices. The system then returns to block 550 (FIG. 5A) and awaits further natural language input.

Although not illustrated in FIGS. 5A and 5B, in some implementations the system may optionally search one or more public databases in the method 500 and may optionally generate output with content from the public databases. Such public database content may be included in output in combination with content from a personal entry and/or in lieu of content from the personal entry.

Figure 6:
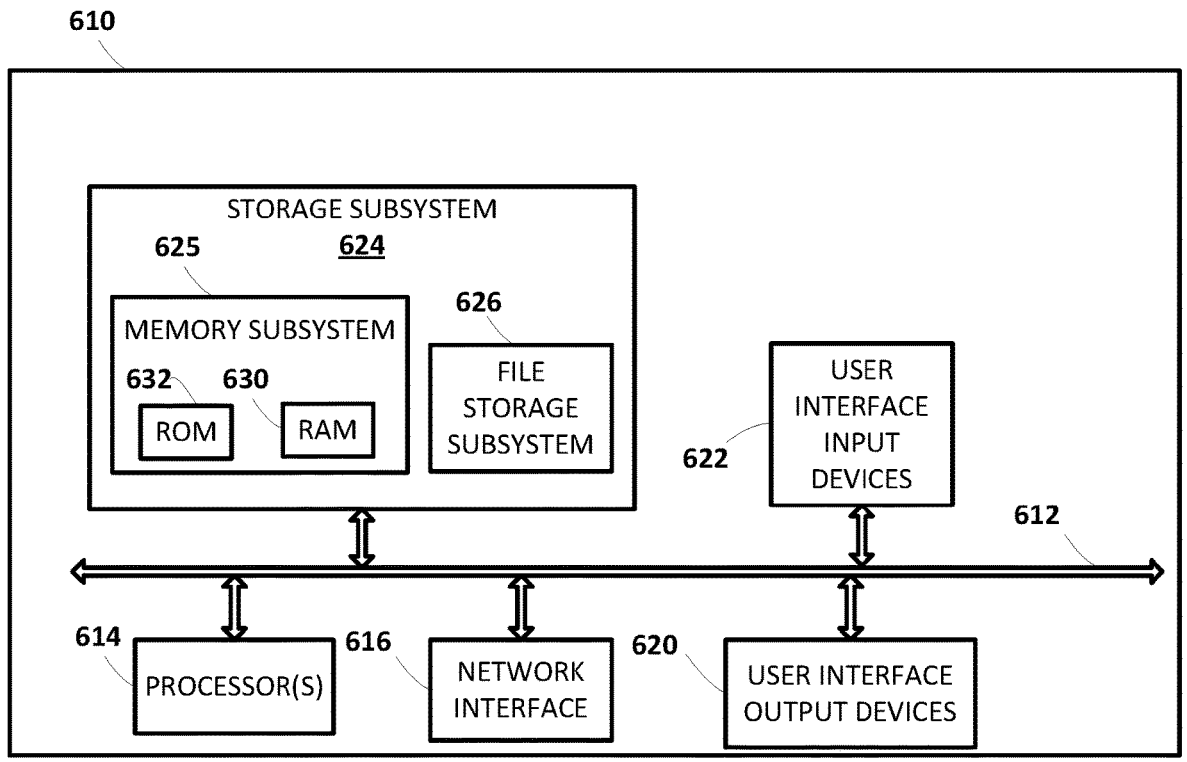
FIG. 6 illustrates an example architecture of a computing device.

FIG. 6 is a block diagram of an example computing device 610 that may optionally be utilized to perform one or more aspects of techniques described herein. In some implementations, one or more of the client computing devices $160_{1-N}$, automated personal assistant 120, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIGS. 5A and 5B.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method performed by one or more processors, comprising:
   receiving first natural language input, the first natural language input being free-form input formulated by a user via a user interface input device of a computing device of the user;
   generating an entry for the first natural language input in a personal database of the user stored in one or more computer readable media, the generating comprising:
      storing, in the entry, one or more given terms of the terms of the first natural language input or an identifier of the given terms,
      generating descriptive metadata based on both:
         one or more of the terms of the first natural language input, and
         one or more contextual features associated with receiving the first natural language input,
         wherein generating the descriptive metadata based on the one or more contextual features associated with receiving the first natural language input comprises:
            generating temporal metadata that indicates a date or time that the first natural language input was received, and
            generating locational metadata that indicates a location of the user when the first natural language input was received, and
      storing the descriptive metadata in the entry;
   receiving second natural language input subsequent to receiving the first natural language input, the second natural language input being free-form input formulated by the user via the user interface input device or an additional user interface input device of an additional computing device of the user;
determining, based on the second natural language input, at least one search parameter;
searching the personal database based on the at least one search parameter;
determining, based on the searching, that the entry is responsive to the second natural language input and that an additional entry stored in the personal database is responsive to the second natural language input, the determining the entry is responsive to the second natural language input is based at least in part on matching the at least one search parameter to at least some of the descriptive metadata;
selecting the entry in lieu of the additional entry based on conformance of a current location of the user when the second natural language input was received to the locational metadata of the entry that indicates the location of the user when the first natural language input was received;
generating natural language output that includes one or more natural language output terms that are based on the entry; and
providing, in response to the second natural language input and in response to selecting the entry, the natural language output for presentation to the user via a user interface output device of the computing device or of the additional computing device,
wherein providing the natural language output that includes the one or more natural language output terms based on the entry is in response to selecting the entry in lieu of the additional entry,
wherein the additional entry is not utilized in generating the natural language output, and
wherein no output that is based on the additional entry is provided in response to the second natural language input.

2. The method of claim 1, wherein generating the natural language output comprises generating one or more temporal terms of the natural language output based on the temporal metadata of the entry.

3. The method of claim 1, wherein generating the natural language output comprises generating one or more locational terms of the natural language output based on the locational metadata of the entry.

4. The method of claim 1, wherein the first natural language input is provided during communication between the user and at least one additional user and wherein generating the descriptive metadata based on one or more contextual features associated with receiving the first natural language input comprises:
generating additional user metadata of the descriptive metadata, the additional user metadata identifying the additional user in communication with the user when the first natural language input was received.

5. The method of claim 4, wherein the communication between the user and the additional user is via a first message exchange client of the computing device of the user and a second message exchange client of an additional user computing device of the additional user.

6. The method of claim 1, wherein generating the descriptive metadata based on one or more of the terms of the first natural language input comprises:
generating a semantic label of the descriptive metadata based on one or more of the terms, the semantic label indicating a classification to which the one or more terms belong and to which additional terms not included in the first natural language input also belong.

7. The method of claim 6, wherein the at least one search parameter is a semantic search parameter and wherein determining that the entry is responsive to the second natural language input comprises matching the semantic search parameter to the semantic label.

8. The method of claim 7, wherein determining the search parameter is based on a prefix of the second natural language input.

9. The method of claim 7, wherein selecting the entry is further based on conformance of the second natural language input of the user to the semantic label of the entry.

10. The method of claim 1, further comprising:
determining, based on at least one of the terms of the second natural language input, a measure indicative of a likelihood that the second natural language input is a request for information from the personal database;
wherein the searching is dependent on a magnitude of the measure.

11. A method performed by one or more processors, comprising:
receiving first natural language input, the first natural language input being free-form spoken input formulated by a user via a user interface input device of a computing device of the user;
generating an entry for the first natural language input in a personal database of the user stored in one or more computer readable media, the generating comprising:
storing, in the entry, one or more given terms of the terms of the first natural language input or an identifier of the given terms,
generating descriptive metadata based on at least one of:
one or more of the terms of the first natural language input, and
one or more contextual features associated with receiving the first natural language input, the one or more contextual features including at least:
locational metadata that indicates a location of the user when the first natural language input was received, and
temporal metadata that indicates a time when the first natural language input was received, and
storing the descriptive metadata in the entry;
receiving second natural language input subsequent to receiving the first natural language input, the second natural language input being free-form spoken input formulated by the user via the user interface input device or an additional user interface input device of an additional computing device of the user;
determining, based on the second natural language input, at least one search parameter;
searching the personal database based on the search parameter;
determining, based on the searching, that the entry is responsive to the second natural language input, the determining based at least in part on matching the search parameter to at least one of the given terms in the entry;
determining, based on the searching, that an additional entry is also responsive to the second natural language input;
ranking the entry relative to the additional entry based on conformance of:
a current location of the user when the second natural language input was received to the locational metadata that indicates the location of the user when the first natural language input was received, and a current time when the second natural language input was received to the temporal metadata that indicates the time when the first natural language input was received;

generating natural language output that includes one or more natural language output terms that are based on the entry; and providing, in response to the second natural language input, the natural language output for presentation to the user via a user interface output device of the computing device or of the additional computing device, wherein providing the natural language output is based on the ranking of the entry relative to the additional entry.

12. The method of claim 11, wherein providing the natural language output based on the ranking of the entry relative to the additional entry comprises providing the natural language output without providing any output that is based on the additional entry in response to the second natural language input.

13. The method of claim 11, wherein providing the natural language output based on the ranking of the entry relative to the additional entry comprises providing the natural language output and providing additional output based on the additional entry, and providing the natural language output and the additional output for presentation in an order that is based on the ranking.

14. A device, comprising:

memory and one or more processors, the memory storing instructions that, when executed by the one or more processors, cause the one or more processors to:

receive first natural language input, the first natural language input being free-form input formulated by a user via a user interface input device;

generate an entry for the first natural language input in a personal database of the user stored in one or more computer readable media, wherein in generating the entry the one or more processors are to:

store, in the entry, one or more given terms of the terms of the first natural language input or an identifier of the given terms, generate descriptive metadata based on both:

one or more of the terms of the first natural language input, and one or more contextual features associated with receiving the first natural language input, including locational metadata that indicates a location of the user when the first natural language input was received, and store the descriptive metadata in the entry;

receive second natural language input subsequent to receiving the first natural language input, the second natural language input being free-form input formulated by the user via the user interface input device or an additional user interface input device;

determine, based on the second natural language input, at least one search parameter;

search the personal database based on the at least one search parameter;

determine, based on the searching and based at least in part on matching the at least one search parameter to at least some of the descriptive metadata, that the entry is responsive to the second natural language input and that an additional entry stored in the personal database is responsive to the second natural language input;

select the entry in lieu of the additional entry based on conformance of a current location of the user when the second natural language input was received to the locational metadata of the entry that indicates the location of the user when the first natural language input was received;

generate natural language output that includes one or more natural language output terms that are based on the entry; and provide, in response to the second natural language input and in response to selecting the entry, the natural language output for presentation to the user via a user interface output device wherein providing the natural language output that includes the one or more natural language output terms based on the entry is in response to selecting the entry in lieu of the additional entry, wherein the additional entry is not utilized in generating the natural language output, and wherein no output that is based on the additional entry is provided in response to the second natural language input.

15. The device of claim 14, wherein the device further comprises the user interface input device and the user interface output device.

16. The device of claim 14, wherein the device further comprises the personal database.

* * * * *